(12) United States Patent
Marcus et al.

(10) Patent No.: US 9,569,596 B2
(45) Date of Patent: Feb. 14, 2017

(54) SECURE WORKFLOW AND DATA MANAGEMENT FACILITY

(71) Applicant: Evizone IP Holdings, Ltd., Tortola (VG)

(72) Inventors: Michael Bernard Marcus, Chicago, IL (US); William McDowall Wells, St. James (BB)

(73) Assignee: EVIZONE IP HOLDINGS, LTD., Tortola (VG)

( * ) Notice: Subject to any disclaimer, the term of this patent is extended or adjusted under 35 U.S.C. 154(b) by 0 days.

(21) Appl. No.: 14/263,709

(22) Filed: Apr. 28, 2014

(65) Prior Publication Data

US 2014/0237626 A1 Aug. 21, 2014

Related U.S. Application Data

(63) Continuation of application No. 12/784,129, filed on May 20, 2010, now Pat. No. 8,763,140.

(60) Provisional application No. 61/179,735, filed on May 20, 2009, provisional application No. 61/180,555, filed on May 22, 2009.

(51) Int. Cl.
  *G06F 21/10* (2013.01)
  *G06Q 10/06* (2012.01)
  *G06Q 10/10* (2012.01)
(52) U.S. Cl.
  CPC .............. *G06F 21/10* (2013.01); *G06Q 10/06* (2013.01); *G06Q 10/107* (2013.01)
(58) Field of Classification Search
  CPC ..................................................... G06F 21/10

USPC ........................................................... 726/26
See application file for complete search history.

(56) References Cited

U.S. PATENT DOCUMENTS

| | | | | |
|---|---|---|---|---|
| 7,523,309 | B1 * | 4/2009 | Talbot | H04L 12/58 713/164 |
| 7,639,943 | B1 * | 12/2009 | Kalajan | G03B 29/00 396/429 |
| 8,266,421 | B2 * | 9/2012 | Sidman | H04L 29/12386 380/255 |
| 8,644,702 | B1 * | 2/2014 | Kalajan | H04N 21/64784 396/429 |
| 2002/0174010 | A1 * | 11/2002 | Rice, III | G06F 17/30194 705/14.67 |

(Continued)

*Primary Examiner* — Izunna Okeke
*Assistant Examiner* — Ali Shayanfar
(74) *Attorney, Agent, or Firm* — Levenfeld Pearlstein, LLC

(57) ABSTRACT

Disclosed is a computer program that provides a secure workflow environment through a cloud computing facility, wherein the secure workflow environment may be adapted to (1) provide a plurality of users with a workspace adaptable to provide secure document management and secure communications management, wherein the users comprise at least two classes of user, including a participant and a subscriber, the subscriber having control authority within the workspace that exceeds that of the participant and the participant having control over at least some of the participants own interactions with the workspace, (2) maintain a secure instance of each communication provided by each of the users such that each communication can be managed, (3) maintain a secure instance of each document interaction provided by each user such that each interaction can be managed; and extending the secure workflow environment to the users through a secure network connection.

24 Claims, 18 Drawing Sheets

(56) References Cited

U.S. PATENT DOCUMENTS

| | | | |
|---|---|---|---|
| 2003/0139938 A1* | 7/2003 | Meyers | G06Q 30/06 |
| | | | 726/18 |
| 2004/0088261 A1* | 5/2004 | Moore | G06Q 20/382 |
| | | | 705/64 |
| 2007/0143486 A1* | 6/2007 | Kang | H04L 29/12311 |
| | | | 709/229 |
| 2009/0204957 A1* | 8/2009 | Nishibayashi | G06F 3/1462 |
| | | | 717/172 |
| 2009/0307308 A1* | 12/2009 | Siegemund et al. | 709/203 |
| 2010/0083386 A1* | 4/2010 | Kline | G06F 21/33 |
| | | | 726/34 |
| 2010/0217865 A1* | 8/2010 | Ferris | 709/226 |
| 2010/0251242 A1* | 9/2010 | Sivasubramanian et al. | 718/100 |

* cited by examiner

FIG. 2

Control Panel – Documents (2)

| Name | Description | Owner | Date |
|---|---|---|---|
| Africa.docx | Africa | troll test | 03/26/2009 1 |
| Early civilizations... | Early civilizations | troll test | 03/26/2009 1 |
| The Outline of S... | The Outline of ... | troll test | 03/26/2009 1 |
| bmp.bmp | bmp | troll test | 03/27/2009 0 |
| G20 leaders gat... | G20 | troll test | 03/31/2009 2 |
| Major cyber spy... | Spy network un... | troll test | 03/31/2009 2 |
| Cyber spying.doc | Cyber spying | Tomasz Leznicki | 03/31/2009 2 |
| Spy-night-scope... | Spy night scope | troll test | 04/01/2009 0 |
| spy_vs_spy_cou... | Spy_vs_spy | troll test | 04/01/2009 0 |
| spy-bat-2.jpg | Spy bat | troll test | 04/01/2009 0 |
| spy%20cat.jpg | Spy cam car | troll test | 04/01/2009 0 |
| Industrial espion... | Industrial espio... | Tomasz Leznicki | 04/01/2009 0 |

- All documents
- Status
- Views
- Access point

FIG. 15

SECURE WORKFLOW AND DATA MANAGEMENT FACILITY

CROSS-REFERENCE TO RELATED APPLICATIONS

This application is a continuation of U.S. application Ser. No. 12/784,129, filed May 20, 2010, which claims the benefit of U.S. Provisional Patent Application No. 61/179,735, filed May 20, 2009, and U.S. Provisional Patent Application No. 61/180,555, filed May 22, 2009, the contents of each of the foregoing are incorporated herein by reference.

BACKGROUND OF THE INVENTION

Field of the Invention

The present invention is related to computer data management, and more specifically to secure computer-based management of workflow and data.

Description of the Related Art

Computer users want assurance that their computers represent a secure environment for their data and communications with others. In addition, users want to maintain sequence and tracking of distribution while working collaboratively. However, users are currently limited to tools that may allow them to control the archiving of data products after the fact, allow them to create categorized data hierarchies before the fact, or provide loosely controlled collaboration tools, but don't provide a controlled environment or context for their collaboration for the creation and maintenance of a controlled dynamic environment for data and communications. Therefore a need exists for a secure computer-based system for the management of workflow and data that enables traceability, control, and the establishment of a context for collaborative work, while allowing for active changes in the environment to accommodate the evolving needs of users.

BRIEF DESCRIPTION OF THE FIGURES

The invention and the following detailed description of certain embodiments thereof may be understood by reference to the following figures:

Figure 2:
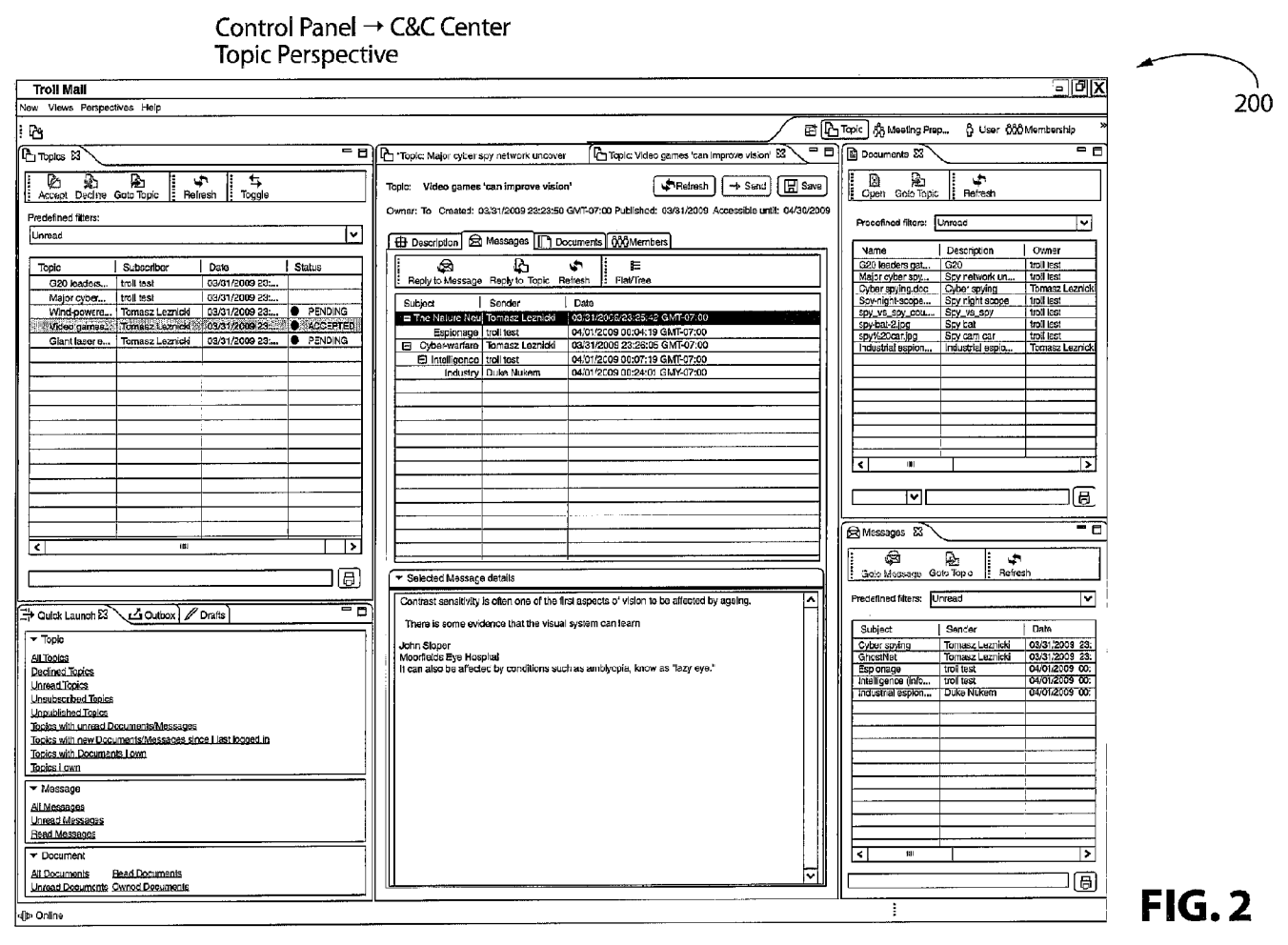

FIG. 2 depicts a topic perspective view of the control panel in an embodiment of the present invention.

FIG. 5 depicts the documents portion of the control panel as depicted in full perspective view in FIG. 3.

Figure 14:
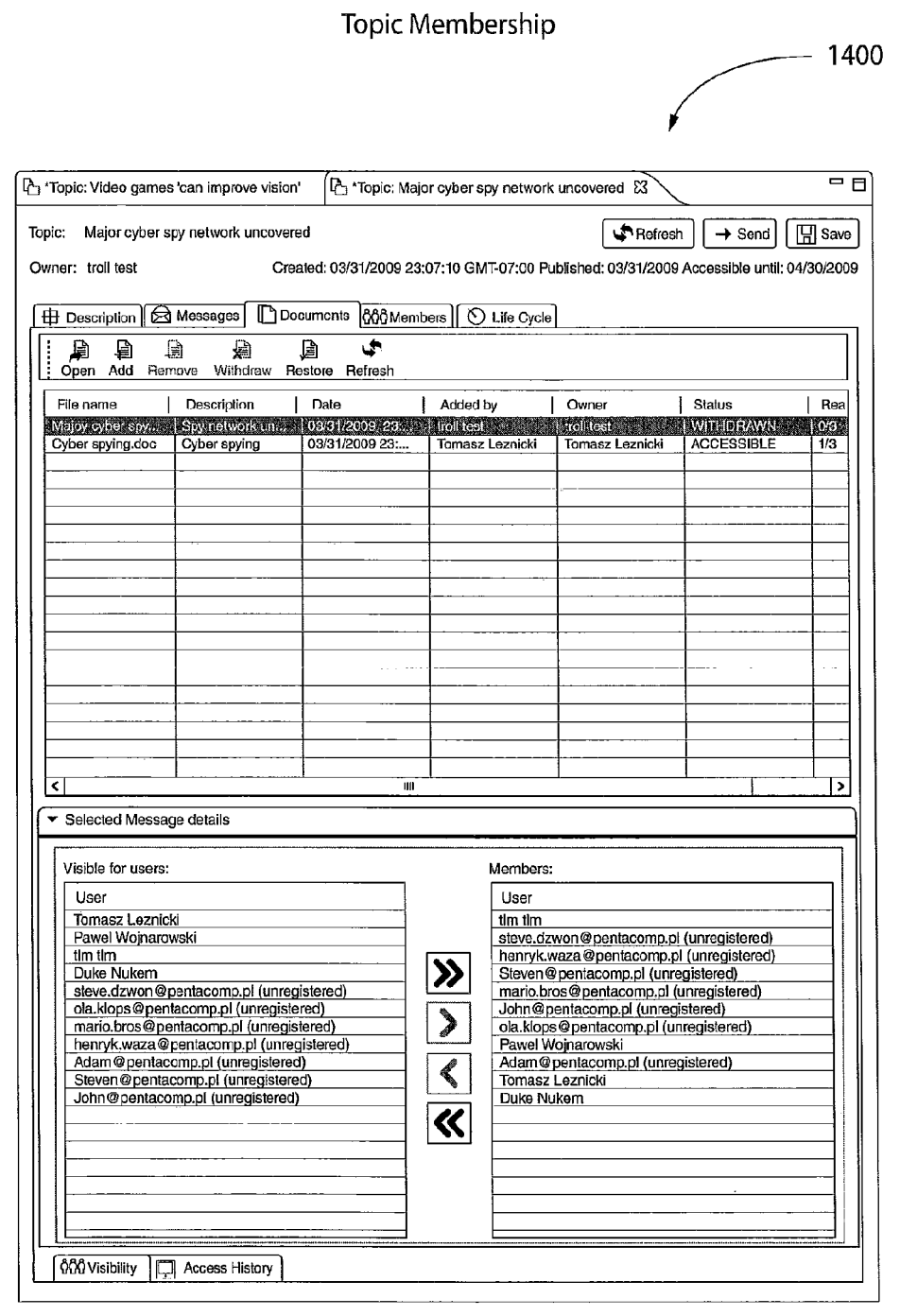

FIG. 14 depicts a topic membership window in an embodiment of the present invention.

Figure 15:
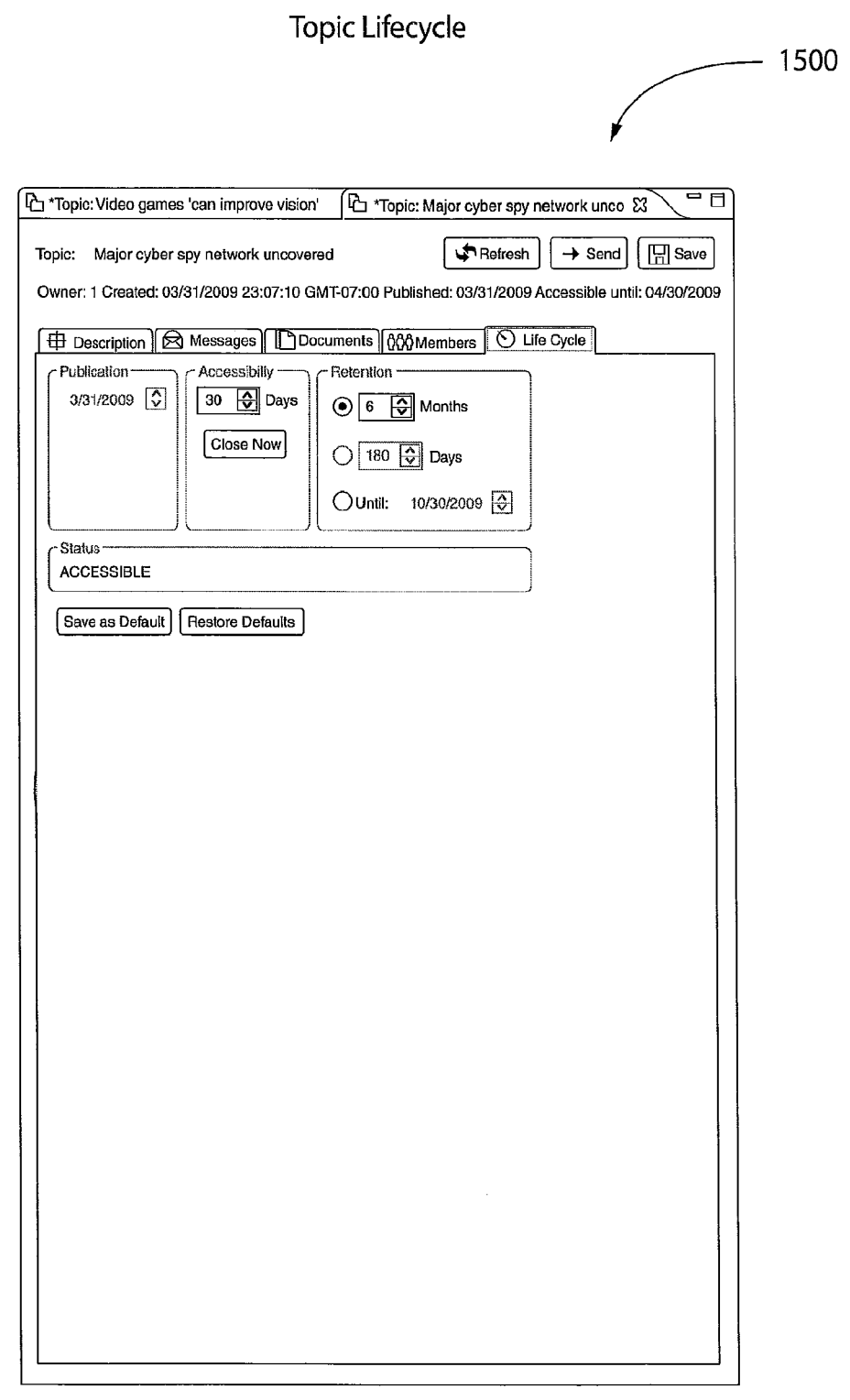

FIG. 15 depicts a topic lifecycle window in an embodiment of the present invention.

Figure 1:
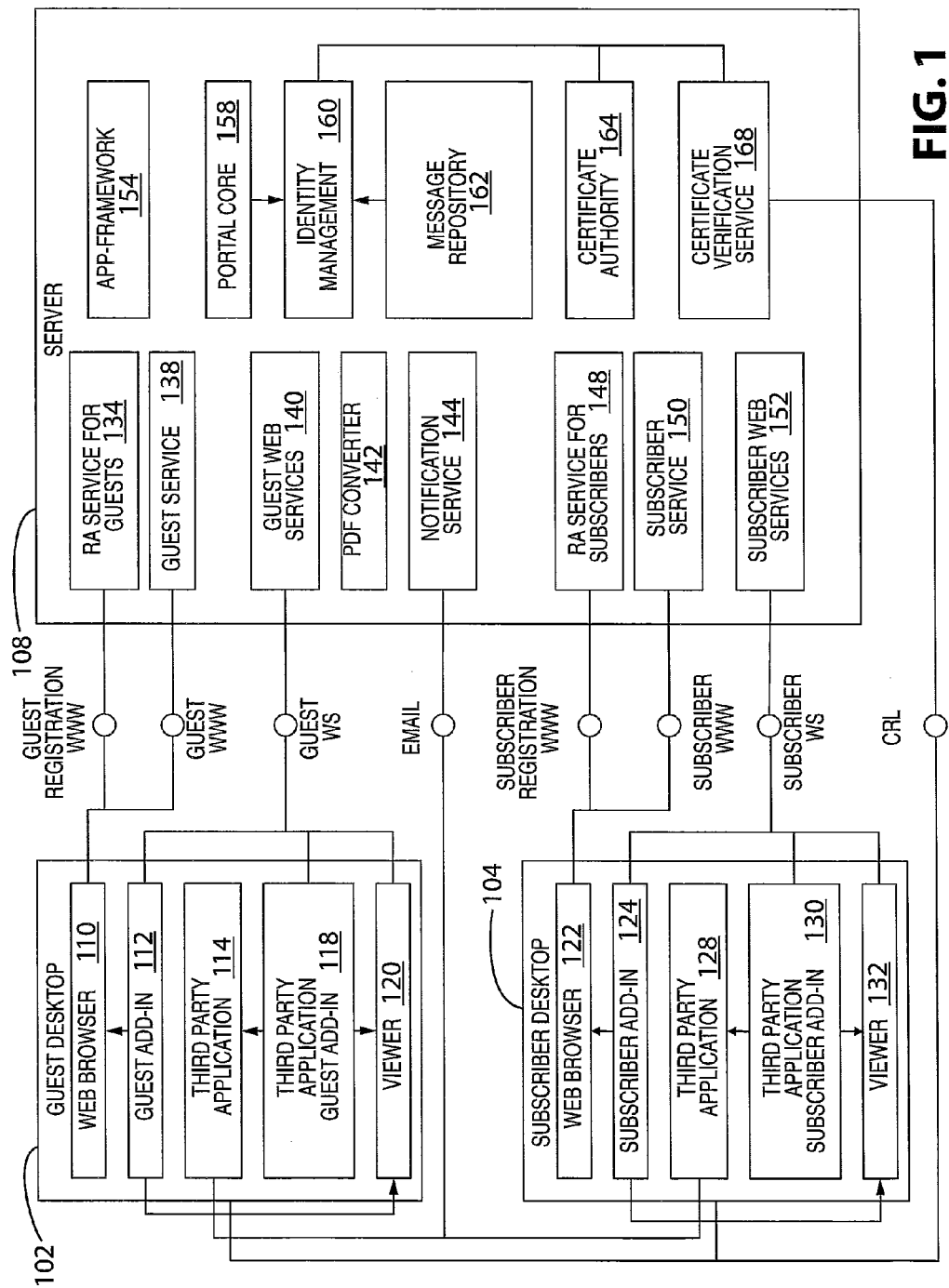
FIG. 1 depicts a logical architecture diagram in an embodiment of the present invention.

While the invention has been described in connection with certain preferred embodiments, other embodiments would be understood by one of ordinary skill in the art and are encompassed herein.

All documents referenced herein are hereby incorporated by reference.

DETAILED DESCRIPTION OF THE PREFERRED EMBODIMENTS

The present invention fulfills the need to ensure security and confidentiality of sensitive computer-generated information, especially when collaboration takes place across organizational boundaries and over multiple systems. The challenge is compounded by the diversity of processing over systems with different standards, geographical boundaries, controls, and levels of security. The present invention provides a service to enable subscribers to incorporate internal and external collaborators, supply chain members, consultants, professionals, and others into a work group by simply exporting a software communications and embedded security service of the present invention to others. In embodiments, the setup is fast (e.g. less than 10 minutes), automated, does not require technical expertise particular to the present invention, and is easy to learn and use. Installation and registration of the present invention creates a security zone that includes the origination, transmission, content repository, and end use of written communications. The value of the present invention includes ease of use and the ability to maintain security without external provisioning of standard or custom hardware devices for the identification of individuals and special maintenance of security. While these devices can be used by incorporation into the basic service, these devices are not necessary to create a highly secure environment. Accordingly, communications can be established without the need to pre-establish a hardware-based environment and the time, inconvenience, and cost of managing the provisioning, installation, training in use and maintenance of such devices. In addition, with new encryption technologies under continuous development as increases in computing power (efficiency) enable older codes vulnerable to decryption by standard attack methods, the present invention provides centralized control of documentation to maintain updated security. That is, the present invention does not distribute documents, and encryption of documents (or other security methodologies) may be updated by a centralized server as newer technologies make older technologies less secure. In embodiments, security may be achieved through a combination of features that creates and maintains an integrated secure environment, such as including:

The communications, documents, data, and the like that a sender wishes to share with others, and consequently makes available to them, may be rendered accessible in a manner which does not permit any impression or image of the content on any hardware, or in any database or other repository, which is subject to control by the recipient, even during actual viewing.

The sender may prevent the recipient from altering communications, documents, data, and the like, as accessed.

The recipient may be unable to print, alter, copy electronically, retransmit to others, and the like, to others the communications, documents, data, and the like shared by the sender.

The sender may predetermine the length of time the communications, documents, data, and the like are accessible by any recipient, which may differ from the length of time it is accessible to other recipients, and may differ on a document-by-document or data point-by-data point basis as to any particular recipient.

The sender may alter the duration that any communication, document, data, and the like, is accessible to any recipient, at any time, by recalling the content in such a way that no trace remains accessible to the recipient.

All sender control capabilities may reside with a designated owner of the "topic" to which particular communications, documents, data, and the like relate, rather than any individual member of a topical group, or by a manager designated by a subscriber organization to control access as to all topics for documents and data provided by the organization.

An audit trail may be electronically generated on a cloud computing facility, accessible only to the topic owner or organizational manager, showing which recipients actually accessed any particular document or data for viewing, when, and how often. This may not only contribute to security but also facilitate accountability within a working group by providing information as to whether its members have performed assigned tasks, adequately prepared for meetings, and the like. This may also facilitate confirmation of a working group's or organization's compliance with legal or organizational restrictions on information access by providing a record not only of who had potential access to information, but also who may actually have viewed it and who else, by inference, could not have.

The foregoing may be accomplished in part by software which has been designed to anticipate all the different technical mechanisms and systems through which a recipient or other person might attempt to alter, print, copy, or transmit documents or data, or through which those functions might otherwise automatically be attempted by a system; maintaining a continuous real time exchange of electronic information between the system and the recipient's equipment in order to sense attempts to alter, print, copy, transmit, and the like, the communications, documents data, and the like; and blocking those attempts through responsive signals from the system. Continuous updating of the control software to respond to developing technologies that ordinarily permit alteration, printing, copying, transmission, and the like, may therefore be a feature of the present invention.

Any recipient's access to documents or data may be restricted and controlled by mechanisms which automatically verify, at each time that access is sought, that the equipment and e-mail address from which the request emanates has been pre-approved by the topic owner or by the organization's designated access manager.

The subscriber organization may have the ability to upload documents and data onto the system without assistance so that access even by operational personnel associated with the present invention may be restricted.

The present invention may provide a system for secure and convenient communication, maintaining sequence and tracking of distribution to create an objective source of information about a topic (i.e. the subject of the interchange), such as secure communication through exchanging encrypted messages and deployed public key infrastructure with their own certificate authority, ability to control the lifecycle of messages, provide security of stored and transmitted data, provide confidentiality, ease of use for all types of users, and the like. The present invention may provide organized work products in workflow threads, linking, controlling, managing, securing, all the elements of the work effort for users, documents, viewing, access, history, and the like. The present invention may enable the preservation of a context that provides additional meaning relative to the collaboration, such as timelines, when documents (and pages of documents) were accessed (carrying a presumption of reading the material, where the terms 'reading' and 'viewing' are used interchangeably herein), exchange of memos and messages, and the like, where the establishment of the context through maintaining the organization and structure of exchanges may add meaning and a deeper level of understanding for the collaboration. In embodiments, a document as referred to herein may be a document file, spreadsheet, picture file, chat session, instant message, video file, video recording, audio-video recording, audio file, audio and voice recording, voice service, speech-to-text transcription, text-to-speech transcription, internet content, presentation file, email message, internet telephone call, video call, maps, map layer associated with data, RSS and other feeds, computer data file, computer encoded data file, annotations, and any other form of electronic communication or documentation. In embodiments, the present invention may provide for a searching function, where any document described herein may be searched for, limited by searching, searched for by topic, and the like. In embodiments, the present invention may have an embedded search interface, such as Google search, Yahoo search, and the like. In embodiments of the present invention, searches conducted with the embedded search interface may provide confidential searches, such as providing for confidential queries, confidential search results, and the like, as opposed to the public searches provided by public versions of the search interfaces.

The present invention may provide for secure confidential communications, such as a managed service providing encrypted and secure confidential communications. Unlike conventional email with document attachments, the messages and documents cannot be saved, copied, printed, altered, or forwarded. In fact, messages and documents are not permanently stored on either the senders' or recipients' computers. In embodiments, the subscriber may have complete control over who can see their messages and documents and when.

In embodiments, the present invention may provide for communications management. Traditional communication solutions; such as email and document exchange, require that organization and management occur after messages and documents have already been created and exchanged. This requires that users create folders and subfolders into which they drag and drop documents/email. In time, as more communications are received and retained, the user will spend increasing amounts of time simply organizing documents and messages. The present invention may provide core capabilities that automatically organize communications, such as documents and messages automatically organized into topics and individual communications. Topics may provide a default policy for the lifecycle of the documents and messages they contain. This default life cycle policy may control when documents and messages are published and become viewable, how long they will remain accessible, how long they will be retained, and the like. Individual communications may automatically organize one-to-one communications between two users, where messages and replies are organized into conversation threads, messages and documents remain accessible and are retained for a period of time (e.g. 90 days) before they are permanently deleted, and the like.

In embodiments, the present invention may provide for secure communications that are an improvement over traditional communication solutions that are insecure, such as email and document exchange. Whether through a stolen notebook computer, a shared printer, movement of files onto a USB thumb drive, system backups or simply an email or document being copied, printed or forwarded to the wrong person, security with these traditional communication solutions is beyond the user's control. The present invention may provide a secure communications service giving the owner complete security and control over their documents and messages, such as document and message owners determining who can view documents; documents and messages not being allowed to be copied, stored, forwarded, altered, or printed; the owner setting the default life cycle policy which determines when documents and messages are published, how long they remain accessible and how long they will be retained; the owner may remove a topic, document, or message from view, and the like.

In embodiments, the present invention may provide for workgroup and one-to-one communications, such that searching and organizing email and documents may be easier. The present invention may have communications management designed into the service; providing topics for workgroup communications and individual communications for ad hoc one-to-one communications. The present invention may use the model of exchanging written documents and correspondence amongst a workgroup focused on a given theme, which may also be referred to this as a 'Topic'. Topics may contain all of the messages and documents that pertain to a specific subject or area, are exchanged amongst a specific workgroup of users, are automatically managed by a specific life cycle policy, and the like. Just as Topics may organize workgroup communication, individual communications may do the same for ad hoc communications between two people. All of the messages and documents shared between two users may be made to be easily accessible, and make it simple to organize and find messages and documents. In embodiments, lifetimes may be provided for any communications, including workgroup and individual communications. For instance, the lifetime may be set for each communication, each category of communication, and the like, where the system may provide for a default lifetime. For example, an individual communication may have a 30, 60, 90, and the like default lifetime, after which the communication is permanently deleted.

Individual communications are meant to provide for ad hoc quick communication of messages and documents between two users. The intent of Individual communications is to make it quick and simple for two users to communicate while still maintaining the security and built-in organization. In comparison, Topics are intended to provide a more structured, managed work group communications. Like topics, individual communication messages and documents can be opened in a topic editor. However, the individual communication topic editor may lack some of the management controls of the topic editor. For example, since all individual communication messages and documents remain visible for a period of time and then become inaccessible, the individual communication topic editor may not have any visibility controls beyond the ability to withdraw or restore messages or documents.

In embodiments, two users may communicate with each other using individual communications, where the user who sends the first individual communication may appear as the topic owner. Despite this, each user may have control over their posted content. When a subscriber sends an individual communication to a non-subscriber, the non-subscriber may become a guest of the sender. In this case, the guest may reply and post documents back to the sender, but may not be able to send an individual communication to any other user who has not contacted them first. When sending an individual communication a user may select more than one recipient. However, in this case, the recipients may not be able to see each other's replies. When a user sends an individual communication to more than one recipient, they may choose a publish recipient's option if they want to know who else received the same message and/or document(s).

In embodiments, the present invention may provide for the automatic organization of messages. In both workgroup and one-to-one communications, as users iteratively read and reply to messages, it can become difficult to recall a specific message from within a given message thread. Unlike conventional email, the present invention may automatically organize messages within each thread while allowing each message to have a meaningful subject such as instead of requiring the unproductive use of 'Re: previous subject'. For example, if a user received a message with the subject "Are we having a marketing meeting on Friday the 20th?", with conventional email, the reply would be "Re: Are we having a marketing meeting on Friday the 20th?". With the present invention, the user may reply with a subject of "No, marketing meetings have been moved to Thursdays; starting on the 19th". The present invention provides users with a simple effective means of navigating and selecting message threads and selecting, viewing and replying to specific messages. With simplified access and meaningful subjects, users may spend less time searching and more time communicating. The present invention may enable users to send messages in place of conventional email messages to ensure the confidentiality of the content but also to more effectively manage their communications. Unlike conventional email messages, messages of the present invention may be automatically organized. For instance, each message may be contained within a Topic or an individual communication topic. Each message may either start a new message thread or is a reply to an existing message's thread. This may create an easily navigated tree structure as messages are sent and replied to. The message thread may not be dependent upon users reusing a subject line such as "RE:subject line". Users may provide meaningful subject lines to their replies; making it simpler for user's to find the message or reply they are looking for. When a user replies to another message, they may optionally view the messages within the thread and their content while composing the reply. Each message may be managed by the topic life cycle. For example, if the accessibility period were 30 days, all messages within a topic will automatically lose visibility 30 days after the topic's publication date, would be retained for the defined retention period after topic access closes and would be permanently deleted when the retention period ends. In the case of individual communications, each message may remain visible for a period of time, such as 90 days. Individual messages may be recalled or withdrawn from view by their owner. In embodiments, individual communications may be stored within the managed service on computer servers. Individual communications may not be stored locally on any user's computer. In embodiments, individual communications may not be allowed to be copied, forwarded, printed, altered, and may be able to be withdrawn from view at any point. As with all communications and documents of the present invention, individual communications and documents may not be permanently stored on either the user's or the recipient's computer. The present invention may record access history to provide user's with information as to who has read a message, and when and how many times.

Unlike the conventional means of distributing documents attached to email, the present invention may provide a secure means of providing document display, such as where each document is contained within a topic; documents cannot be copied, saved or retained; documents cannot be printed, forwarded, altered, and the like; documents are viewable only by users selected and permitted by the document owner; documents can be withdrawn from display at any time; each document will have the topic life cycle applied, and the like. For example, if the accessibility period were 30 days, the document would lose visibility 30 days after the publication date of the topic and would remain archived for the retention period defined in the life cycle. The document will be deleted permanently when the retention period expires. As with all communications of the present invention, documents may not be permanently stored on either the user's or the recipient's computer. The system may record access history to provide users with information as to who has read or viewed a document, and when and how many times.

In embodiments, the present invention may provide for automatic enforcement of life cycle policy for messages and documents. When a subscriber creates a new topic, they may become that topic's owner. As topic owner, they may invite other subscribers and guests to join the topic's workgroup and may define the life cycle for the communications contained within the topic. In embodiments, the life cycle for a topic may have several components, such as the publication date on which the topic will start, an accessibility period commencing on the publication date, during which the messages and documents submitted by topic members are visible to other users; a retention period commencing after the topic's accessibility period expires, during which messages and documents are retained; and the like. The present invention may automatically permanently delete all messages and documents when the retention period expires.

In embodiments, a subscriber may have a variety of roles in association with a topic, such as they may be the owner of a topic, a topic manager, a subscriber, a guest, and the like. An owner may create a topic, set topic life cycle policy, publication date, accessibility period and retention period; modify the accessibility and retention period; control topic membership; invite subscribers and guests; remove members from topic; assign Topic Manager role to one or more subscribers; remove Topic Manager role from a subscriber; add messages and documents to topic; alter the visibility/access of messages and documents within the topic; and the like. A topic manager may add messages and documents to topic; alter the visibility and access of messages and documents within the topic, modify topic life cycle policy, and the like. A subscriber may add messages and documents to a topic, alter the visibility and access of messages and documents which they have added to the topic; and the like. A guest may add messages and documents to the topic, alter the visibility and access of messages and documents which they have added to the topic, and the like, but may not be able to create new topics or address book functions.

In embodiments, each subscriber may be allowed to include guest use of the service such that a subscriber may communicate with other subscribers and guests (non-subscribers). In an example, each subscriber may be provided with a monthly allotment of Standard Page Views (SPVs), such as 1000, 2000, 5000, and the like SPVs. A Standard Page View may be the resource used to view one page of a document. Messages may be charged at a fraction of this rate. The SPVs used by a subscriber's guests may be deducted from that subscriber's monthly allotment. As a guest, the use of the service may be provided at no cost. As a guest, usage may be limited to viewing and replying to communications which have been sent to you, such as writing messages to the group as a whole, viewing messages from other members of the group, submitting documents for circulation to the group, reading documents that are circulated to you and other members of the group, and the like. In embodiments, an individual may be registered with multiple subscriptions, such as where the individual is registered as a subscriber under multiple accounts to establish different ownership of underlying documents, messages, and the like. For example, an individual might be an employee of Company A, a board member of Company B, and hold a personal Subscription as Person C. The individual may tag participation at the topic level (e.g. drop down choice among current subscriptions) so that usage is charged to the correct party, proper segregation of content is maintained, and the like.

In embodiments, the present invention may provide for 'ownership' facilities. For instance, implementation of the system may call for an employer (payor, account owner, and the like) that pays for subscriptions and would own the content of employees, contractors, and others who were provisioned under an account subscription agreement. To implement these ownership rules, the system may manage changes in status and processes that enable the control over owned documentation. Procedures may be implemented to cover various cases, such as when an owner drops (stops paying for) a subscription, options for recovering or ceding control over content that was contributed previously to other topics and owned topics; termination of subscriber, where the payor may transfer control (e.g. topic owner rights and responsibilities to other subscribers or make a topic inactive; changes in responsibility such as when an individual is transferred, promoted, or otherwise needs to transfer control to subscribers who have assumed some or all of previously held job responsibilities; transition from guest to subscriber status and vice versa, where there are procedures that resolve the ownership; and the like. In embodiments, the roles an individual may take may include subscriber, topic owner, topic manager, guest, topic member, account owner (payor), security manager, administrator (receives invoices), legal officer (e.g. in process, could execute "legal holds" on content pending litigation), and the like. In embodiments, the present invention may also include account management, such as integration with an external billing system, including the registration and provisioning process as integrated with a billing system that processes credit card, ACH electronic clearing, direct bill, and the like. From a security standpoint, credit card verification may be used to check identities for trial subscriptions.

As shown in FIG. 1, an embodiment of the present invention is shown divided into three parts, a guest package (or guest desktop as sometimes referred to herein) 102, a subscriber package (or subscriber desktop as sometimes referred to herein) 104, and a server 108. In embodiments, the guest package and the subscriber package may be similar, except for differences in privileges or functional enablement. For example, the guest package and the subscriber package may be functionally the same, but where the guest is functionally is disabled in such a way that the guest cannot invite others to join, cannot control the life-cycle of documents, cannot initiate a topic, is subject to the policies of the subscriber who invites the guest, and the like. The subscriber package may enable the user to initiate communication, provided with full user functionality, including the ability to load registration information and download components, manage third-party applications (e.g. Microsoft Outlook) behavior such as switching between a standard and a confidential mode, initiate messages, manage documents (e.g. change visibility of documents, change archive strategy, and the like), read and compose messages, view documents, use a subscriber package in a third-party application, use a subscriber web application, and the like. The guest package may enable a user to respond to messages, with limited functionality available, including the ability to register as a guest, respond to communications, read and compose messages, view documents, use a guest package in a third party application, use a guest web application, and the like. The server may provide a plurality of functions that may, in an embodiment of the present invention, represent the main portion of the present invention, including a centralized message repository with notification capabilities, strong user authentication and authorization data repository, secure web services interface for subscriber and guest packages (such as for exchanging messages), internal public key infrastructure, and the like.

In the following description the following terms may be utilized, but are not meant to be limiting in any way. Public key infrastructure (PKI), may be an arrangement that binds public keys with respective user identities by means of a certificate authority (CA), where a CA may be an entity which issues digital certificates for use by other parties. Registration authority (RA) may be a part of PKI that maintains user' identities from which certification authorities can issue digital certificates. Certificate revocation list (CRL) may be a list of certificates which have been revoked, are no longer valid, and should not be relied on by any system user. PKCS#10 may be a format of messages sent to CA to request certification of a public key (e.g. certificate signing request). PKCS#12 may be a file format used to store private keys with accompanying public key certificates, protected with a password-based symmetric key. A message sent through the present invention may be an XML package containing a message with attachments and configuration file secured by industry standards, such as XML-signature syntax and processing, XML encryption syntax and processing, and the like. Simple object access protocol (SOAP) may be a lightweight protocol for exchanging structured information in a decentralized, distributed environment. It may be an XML based protocol that consist of three parts: and envelope that defines a framework for describing what is in a message and how to process it, a set of encoding rules for expressing instances of application-defined data types, and a convention for representing remote procedure calls and responses. xCONFIG may be a special folder on a user desktop for storing configuration data between sessions. xTEMP may be a special folder on a user desktop for storing message configuration data.)(FOLDER may be a special (e.g. confidential) folder on a user desktop for storing outgoing and incoming messages.

In embodiments, all data stored in the system may be encrypted by asymmetric encryption algorithm(s) using the system's server public key. When delivering a message to a recipient, the server may temporarily decrypt the message and encrypt it using recipient's public key. In embodiments, all communication with the server may be encrypted using secure socket layer (SSL) protocol. Data integrity may be ensured by using digital signatures in messages and web services SOAP envelopes. In embodiments, the present invention may be implemented on a single node. In embodiments, the server component may be designed to work in a cluster environment, providing a high availability and failover features. The present invention may be based on exchanging messages by internet and local computer network, where the availability of network connections between users and the server may provide availability of services.

Referring again to FIG. 1, the server may provide a plurality of functions, including an app-framework 154, portal core 158, identity management 160, message repository 162, certificate authority 164, certificate verification service 168, RA service for guests 134, guest service 138, guest web service 140, pdf converter 142, notification service 144, RA service for subscribers 148, subscriber service 150, subscriber web service 152, and the like.

In embodiments, the app-framework 154 component may be a library of utilities and low-level components which may make possible the use of the present invention inside other applications and systems.

In embodiments, the portal core 158 may integrate strong user authentication modules, provide portal framework and workflow engine for deploying applications, provide full integration with security services, and the like.

In embodiments, identity management 160 may provide integrated identity management (e.g. guest data, subscriber data, authorization data, and the like), user provisioning, user data repository available through LDAP protocol (e.g. may be used as an address book in email client applications), authorization data (e.g. roles, groups) repository, and the like.

In embodiments, the message repository 162 may be responsible for storing messages, preparing messages for delivery (such as including decrypting stored messages and encrypting for each recipient), handling batch jobs based on schedule (e.g. documents retaining and disposing), and the like.

In embodiments, certificate authority 164 may include features such as issuing and revoking certificates (such as X.509 certificates), approval mechanism for certification and revocation requests, private keys generated on client or server side, server side key generation (e.g. keys generated in software security module delivered to users as PKCS#12 bundles), client side key generation (e.g. public key delivered as PKCS#10, certificate delivered to user as X.509 certificate), ability to distinguish certificate validity periods for defined user types, and the like. The certificate verification service may be a component for publishing CRL lists (such as using LDAP, LDAPS, HTTP, and HTTPS protocols). In embodiments, CRL lists may be used by subscriber and guest packages for server authentication.

In embodiments, the RA service for guests 134 and subscribers may include the functions for registering guest/subscriber (e.g. creating accounts), registering certificate requests, making issued certificates available to download by a guest/subscriber, collecting certificate revocation requests from guests/subscribers, and the like. In embodiments, the RA service may serve web application graphical user interfaces rendered by the web browser.

In embodiments, the notification service 144 may notify users by emails, including a notification to a new guest where there is an invitation to use the system, notification to a subscriber that a new guest has declined an invitation, notification concerning certificate issuance status (e.g. issued, refused), and the like.

In embodiments, a guest service 138 may be a dedicated web application for guests for reading messages and composing responses. The application may run partially on guests' desktop. In embodiments, a guest web service may deliver dedicated web services to web guest add-in and third party guest add-in. Main functionality for web services may be to deliver messages between guest computer facilities and the server.

In embodiments, a subscriber service 150 may be a dedicated web application for a subscriber for reading and composing messages. The application may run partially on subscribers' desktop. In embodiments, a subscriber web service may deliver dedicated web services to a web subscriber add-in, third-party subscriber add-in, and the like. Main functionality for web services may be in delivering messages between guests and the server.

In embodiments, a pdf converter 142 may transform source files (e.g. Microsoft office documents) to a standard format, such as to a pdf document. Transformed documents may then be served to the viewer at the client's side.

Continuing to refer to FIG. 1, the guest desktop 102 may include a web browser 110, guest add-in 112, third party application component 114, third-party application guest add-in 118, viewer 120, and the like.

In embodiments, a web browser 110 may be used by a guest in a registration process to accept or decline an invitation, register account, download software components, request and download digital certificate, and the like. In embodiments, the web browser may be used in a guest's daily communication when using the web guest add-in. In embodiments, the guest add-in may be a signed component run locally on a guest's desktop, which may provide full functionality available for guests, including reading messages, viewing documents using the documents viewer, viewing other members of a group, responding to communication, storing add-in configuration locally, and the like. In embodiments, web guest add-in with web browser may be used for messaging instead of the third-party application add-in.

In embodiments, a third-party application component 114 may represent a standard electronic mail application by a user, and which may be enhanced by dedicated code (i.e. add-in) provided by the present invention. For example, the third-party application may be Microsoft Outlook, Entourage, Open-Xchange, Lotus Notes, an iPhone application, a blackberry application, a palm application, a Mac application, a PC application, and the like, where the present invention may be an add-in that allows the user the option of using the present invention as part of the third-party application. In embodiments, the third-party application guest add-in 118 may be a dedicated signed add-in, which takes responsibility for a special email folder (e.g. Special-.Directory) to use with the present invention. In embodiments, the add-in may provide full functionality available for guests, including reading messages, viewing documents using the document viewer, viewing other members of a group, responding to communication, storing add-in configuration locally, integration with a third-party application, and the like.

In embodiments, the viewer 120 may be a component that is launched as a desktop application, as a viewer applet, and the like. The viewer may include functionality that provides capabilities to open documents, view documents, close documents, and the like, but limits the ability to copy documents, print documents, forward documents, alter documents, and the like. The present invention may not allow documents to be copied, printed, altered, and forwarded through the system in order to control distribution of documents and messages, although the originator of the document may retain a copy as created on their machine. In embodiments, the originator may request that the original document be scrubbed off their machine, in much the same way that the system scrubs off temporary files created by the system. In embodiments, the same distribution control may be applied to messages, screen shots, or any viewable material available to the user interface. In embodiments, a user may request permission for a document to be printed, whereby granted, the user may perform the print, but may still have no copy of the document retained on their machine. In embodiments, the recipient of a message or document may be able to view it but may not retain a copy of it on their machine in addition to not being able to print, copy, forward, and the like. The message, document, electronic file, and the like, may only exist inside the server, and no copy of the data may be retained on the recipient's machine. In addition when a user or guest creates a message or document no copy of that message or document may remain on their machine, as the message is held on the server. In embodiments, the user may not be able to copy, print, forward, alter, and the like, due to the fact that the displayed image through the viewer may not cached, may not stored permanently, and the like. In embodiments, to get an appropriate performance level, the viewer may fetch single pages of documents from the server side. In embodiments, documents viewed through the viewer may be of a standardized format, such as a pdf. In embodiments, there may be an access event processor that helps manage the visibility of documents, such as posting changes, posting changes at a specified time, allowing for the deferment of postings, looking for new events, and the like, where the access event processor may change the visibility of a document at the time of an event.

In embodiments, the present invention may have an annotation feature associated with making comments to a document. For instance, the annotation feature may allow individual users to annotate comments to a document, such as in the process of reviewing a draft of their own work in preparation for a final version, in providing comments to a document created by another user, in being one of a plurality of reviewers providing comments, and the like. The comments may be attached to the document, provided separately from the document, collated from a plurality of user comments, checked off as read, checked off as approved, attached to other comments, dated, tracked, archived, and the like. In embodiments, comments may be directly associated with the document, such as an attachment to the document, an additional layer to the document, and the like, where the comments may have the same restrictions that documents have, as described herein. In embodiments, comments from a plurality of users to a particular document may be viewed side-by-side, collated into a single set of comments, viewed page-by-page, and the like. In an example, suppose five users are providing comments to a single document in the system. Each user may provide their own comments, where the comments are annotated to the document. With the present invention, the user responsible for collating the comments may now be able to bring up the commented documents side-by-side, thus easing the task of considering all the comments together in forming a final version of the document based on the comments.

Continuing to refer to FIG. 1, the subscriber desktop 104 may include a web browser 122, subscriber add-in 124, third party application component 128, third-party application guest add-in 130, viewer 132, and the like.

In embodiments, the web browser 122 may be used by a subscriber in a registration process and in their daily communication when using a web subscriber add-in 124. In embodiments, the web subscriber add-in 124 may be a signed component run locally on a subscriber's desktop, which may provide full functionality available for subscribers, including initiating communication, reading messages, viewing documents, viewing other members of a group, responding to communications, storing add-in configuration locally, and the like. In embodiments, the web subscriber add-in with web browser may be used for messaging instead of with the third-party application add-in.

In embodiments, the third-party application subscriber add-in 130 may be a dedicated signed third-party add-in, which takes responsibility for a special email folder (Special.Directory) to use with the present invention. The add-in may provide full functionality available for subscribers, including initiating communication, reading messages, viewing documents, viewing other members of a group, responding to communication, storing add-in configuration locally, integration with a third-party application, and the like.

Continuing to refer to FIG. 1, there may be a plurality of interfaces implemented by components for users after authentication, including guest registration WWW, guest WWW, guest WB, email, subscriber registration WWW, subscriber WWW, subscriber WS, and the like. The guest registration WWW interface may represent a web application for creating accounts and downloading required components and certificates. Guest WWW interface may represent a web application for communication functions available for guests. Guest WS interface may represent web services which are available for guests, where core functionality of these web services may be exchanging messages. In embodiments, each message may be encapsulated in signed SOAP envelope. The message may be encrypted XML, hence no encryption may be used on SOAP envelope level. The subscriber registration WWW interface may represent a web application for creating subscriber accounts and downloading required components and certificates. The subscriber WWW interface may represent a web application for using communication functions available for subscribers. The subscriber WS interface may represent web services which are available for subscribers. Core functionality of these web services may be for exchanging messages. The email interface may represent plain text signed notifications (e.g. emails) sent by the server, such as invitations to guests, notifications of guests declining invitations sent to subscribers, notifications of certificate issuance events, and the like. The CRL interface may represent CRL service accessible by LDAP(S) and/or HTTP(S) which is used in strong two-way authentication of components during SSL handshake, message encryption, message signature verification, and the like. In embodiments, every communication may be secured by SSL protocol.

In embodiments, the present invention may be designed and implemented utilizing any number of development tools that one skilled in the art would be familiar. One such tool is the unified modeling language (UML), a standardized general-purpose modeling language known in the field of software engineering. A UML includes a set of graphical notation techniques to crate abstract models of specific systems. In embodiments, the present invention may be compatible with different computer operating systems, including Windows XP, Windows Vista, Win7 (such as 32 bit and 64 bit), Mac Leopard (v 10.5), Mac Snow Leopard (v 10.6), and the like. The present invention may be provided through a network of domains where physical control over data and security may be managed by or under supervision of the data owners and interchange of inter-domain communication processed by the system.

The present invention may provide significant advantages over traditional approaches. For instance, the present invention may be implemented through exporting a secure environment consisting of application software (to execute the work) and security modules that validate whether the protective software is installed and active. The package is implemented in software and so the service may be easily provisioned on an ad hoc basis without the need to distribute, configure, or install additional hardware devices. The installation process may be automated and not require technical support, consulting, or other services to start up. Maintenance may be automated as the system detects the need for updates with each startup of the application so that the secure environment is maintained up-to-date. This may provide a very high level of security that is easy to maintain. In addition, the present invention may provide for private networks, where users can rely upon a certain level of high security within a community. Users may form their own 'closed' communities. Traditional security schemes may rely upon sensitivity of information (e.g. classification level) and an individual's 'need to know'. Topics may be managed by individuals who have personal knowledge of members of the group and the circumstances that require access to the information, and members of the topic may be aware of other participants. Confidentiality may be enhanced by revealing membership in the group to all other members to enable mutual assessment of the decisions to distribute information. Each subscriber/participant may exercise control over access by other members of the topic. Decisions (e.g. the 'need-to-know' by other individuals) are fine grain and can extend to individual documents. For example, members of a topic may be granted access to documents on an individual need-to-know basis. Further, while participation in a given subject matter or correspondence may be by invitation only, individuals must accept or decline the invitation, and so unwanted communications are eliminated.

We will now turn to user interface embodiments of the present invention, which include the use of perspectives. A perspective is a visual container for a set of views and editors. A perspective is also like a page within a book. It may exist within a window along with any number of other perspectives and, like a page within a book, only one perspective may be visible at any time. In embodiments, you may be able to change the layout within a perspective, such as close/open views, editors, change the size, change the position, and the like. There may be a plurality of different perspectives, such as a topic perspective (including different icons, link buttons, outbox view, drafts view, and the like), subscriber perspectives, user perspective, meeting preparation perspective, membership perspective, offline perspective, and the like. For instance, in a topic perspective a guest/subscriber may check or create new topics, messages, documents, and the like. A subscriber may set up a new topic, recall a message, recall a document, manage topic membership, manage topic lifecycle, and the like. A user perspective may offer a plurality of sections, such as owned topics' members, user topics for selected user, documents visible for selected user, messages visible for selected user, and the like. A typical scenario for a user perspective may be someone calling with a specified case, and the user perspective providing information conveniently in one place, what is available to a user, what was/wasn't read/seen, and the like. A meeting preparation perspective may show owned topics, topic members, topic documents and document access history, topic messages and message access history, and the like. A typical scenario for a meeting preparation perspective may be the preparation for a meeting where the individual organizing the meeting may want to know if everyone read the documents and/or messages related to the meeting, verify who can see the documents, know who is reading the documents, and the like. In a membership perspective, owned topics, topic members, topic details, and the like, may be shown. A typical scenario for a membership perspective may be managing topic members, verifying invitation process, and the like. In an off line perspective, the view may be limited, such as to an outbox, drafts, and the like. A typical scenario for the off line perspective may be to determine what is in your local outbox (i.e. what has not been sent yet), what package draft do I have, and the like.

The user interface may provide perspectives, views, editors, and the like, which may make managing and accessing topics, individual communications, documents, and messages easy to organize and access. In embodiments, the present invention may be a managed service, and as such, the end user may be provided with more information than would be available with conventional email and document exchange. The present invention may organize this information in productive ways that the typical user has not previously had access to. For example, with the present invention, a user may easily determine who, in their workgroup, has viewed a document, who hasn't or when was the document last viewed and by whom. The user interface may simplify this type of access by providing the user with multiple "perspectives". Each perspective matches specific tasks the user may want to perform. For example, when a user wants to read new messages and documents and compose new messages and replies, they may use the default 'Topic' perspective. The 'Topic' perspective provides the appropriate views and controls for performing the task of reading and composing communications. When the user wants to determine who has viewed specific messages or documents, they would select the meeting perspective. Each perspective positions multiple display panels on the screen, each containing views, and editors. A view may be a displayed list or menu for selecting specific items, such as topics, messages, documents, users, and the like. Depending upon the selected task, the selection of an item may either open the appropriate editor for that item or act as a filter or link to other displays. For example, selecting a topic and 'Go To Topic' in the Topic's view will open that topic within a topic editor. However, selecting a topic in the Owned Topics view will act as filter, displaying the selected topic's members, messages, and documents in other views. An editor, such as the topic editor, may allow the user to perform specific operations such as reading and composing messages and documents within a specific topic. In embodiments, there may be options for the level of complexity or functions provided through the user interface, such as a full interface view, a basic interface view, and the like, where for instance the basic interface view may enable a new user to more easily utilize the facilities provided through the user interface.

In embodiments, there may be filters to implement and simplify selection operations within the user interface, such as selecting all topics, selecting all active topics, selecting those topics where the user has declined membership, selecting those topics which the user owns, selecting those topics which the user owns with a future publication date, selects topics which the user has accepted but has not opened, selects topics the user has unsubscribed, selects topics to which the user has submitted a document, selecting subscribed topics which have received new documents or messages since the user last logged in, selecting any subscribed topics containing documents or messages which the user has not viewed, and the like.

Figure 3:
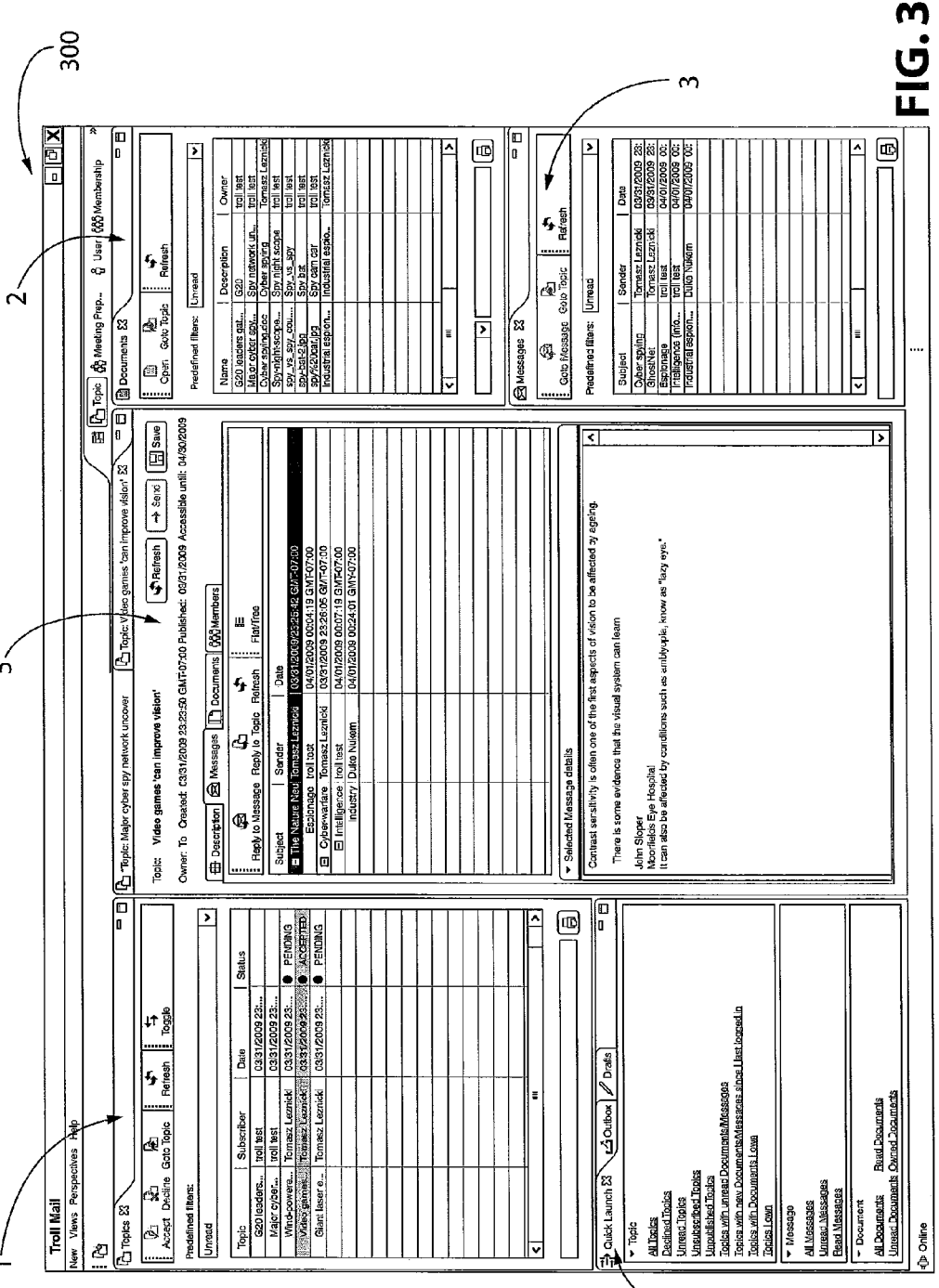
FIG. 3 depicts a topic perspective view of the control panel in an embodiment of the present invention, where sub-views of the control panel are indicated as 1-5, and provided in greater detail in FIGS. 4-11.
Figure 4:
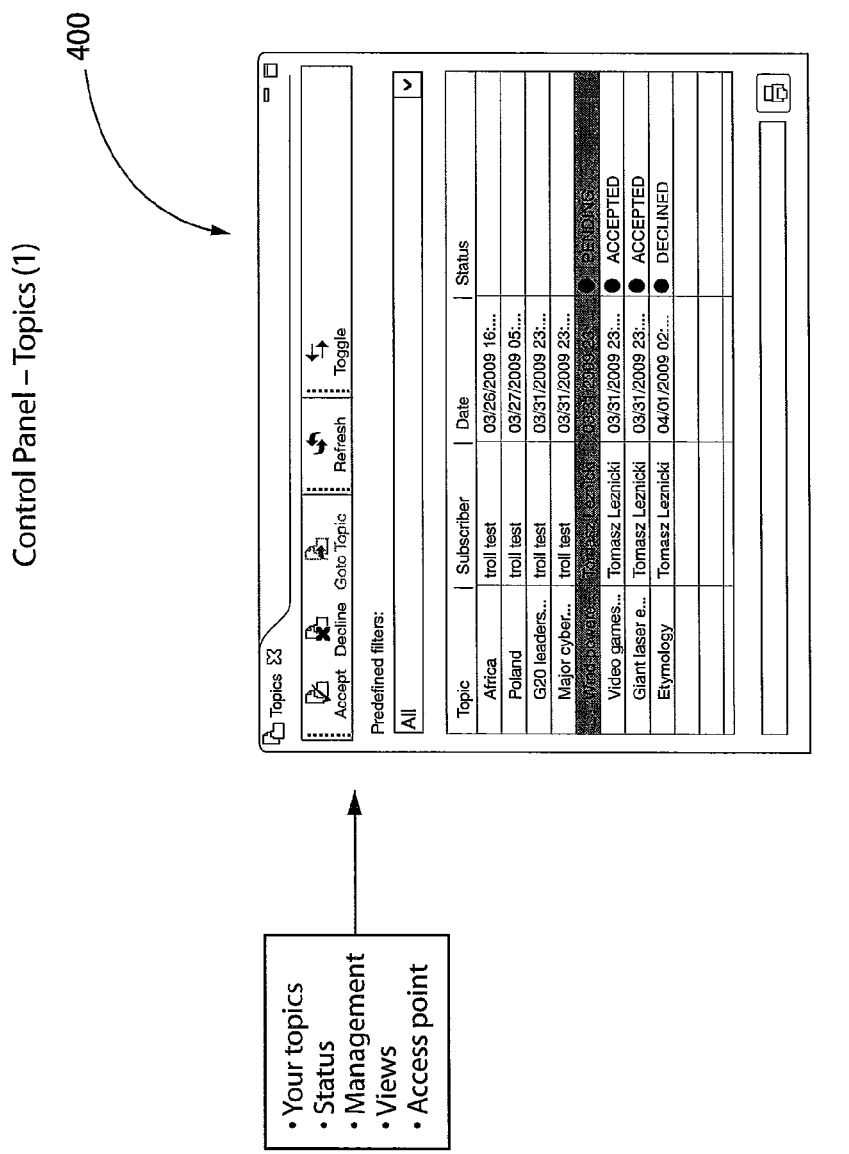
FIG. 4 depicts the topics portion of the control panel as depicted in full perspective view in FIG. 3.
Figure 6:
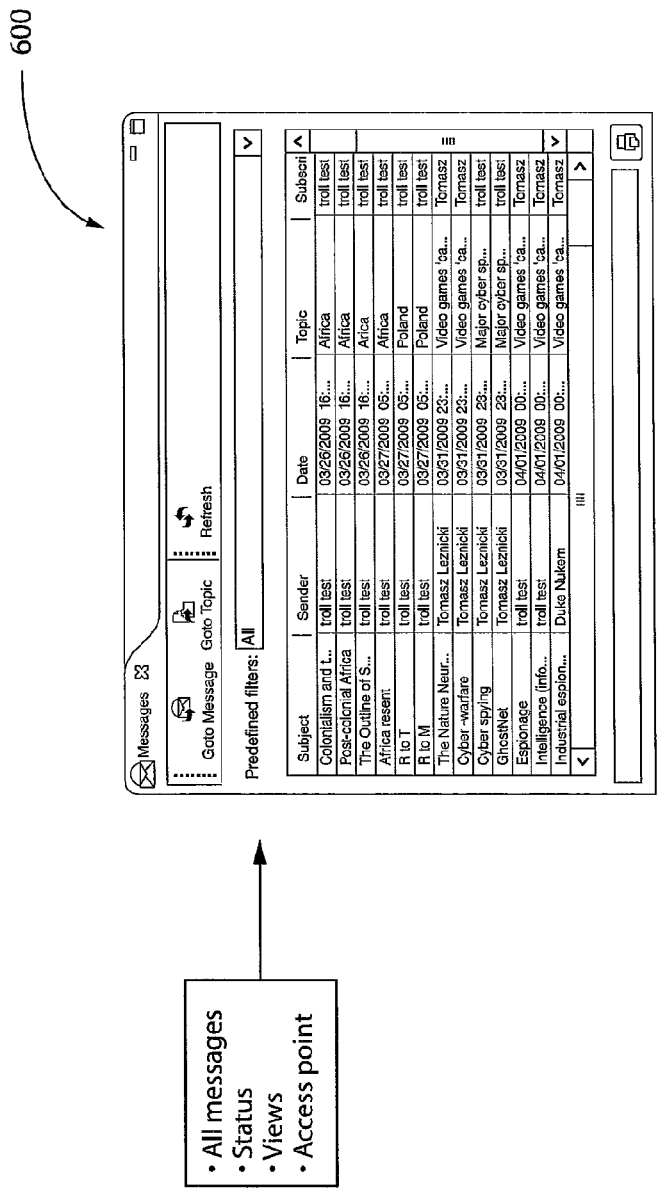
FIG. 6 depicts the messages portion of the control panel as depicted in full perspective view in FIG. 3.
Figure 7:
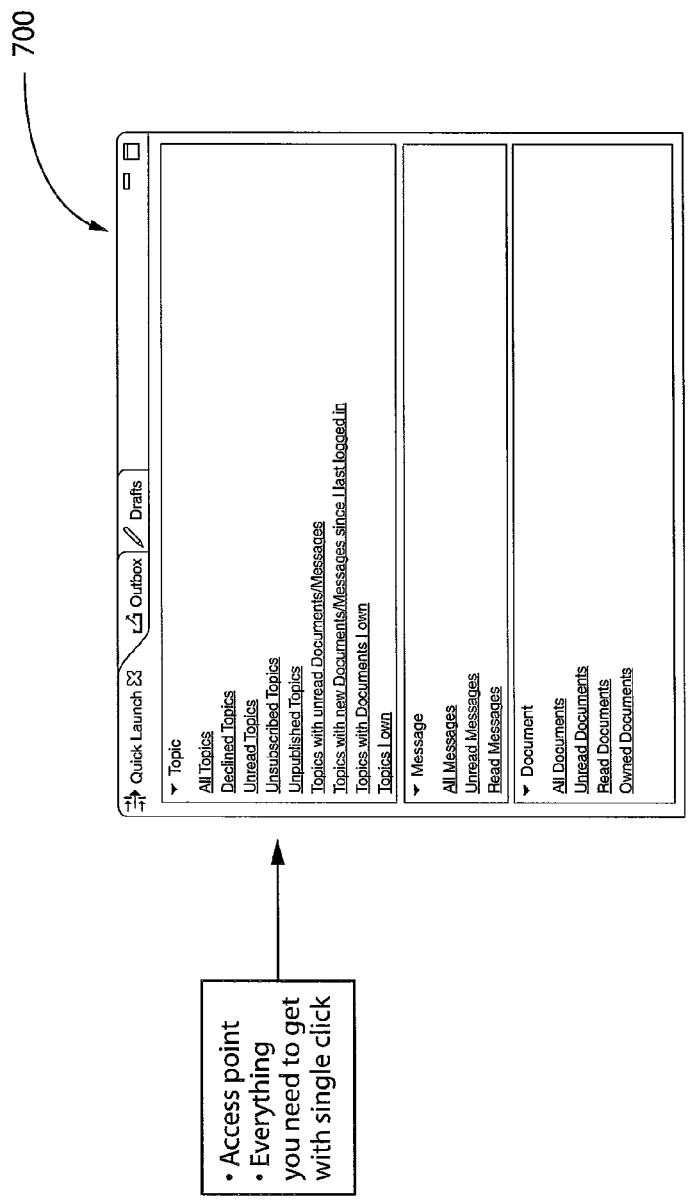
FIG. 7 depicts the quick links portion of the control panel as depicted in full perspective view in FIG. 3.
Figure 8:
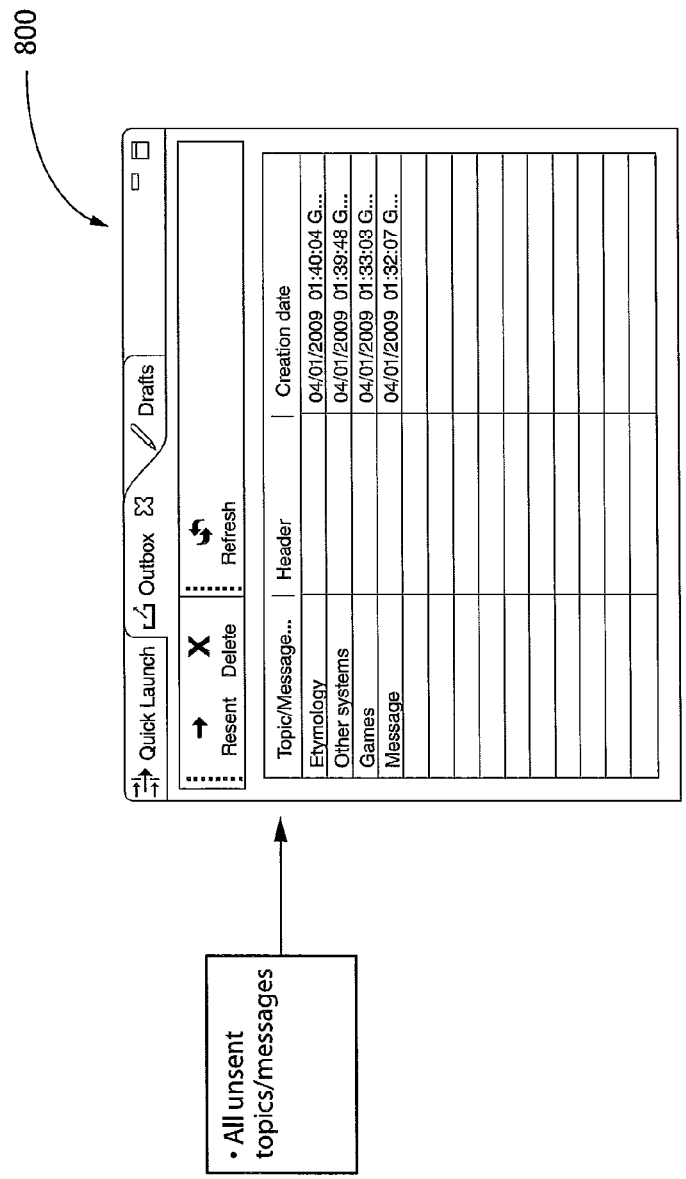
FIG. 8 depicts the outbox portion of the control panel as depicted in full perspective view in FIG. 3.
Figure 9:
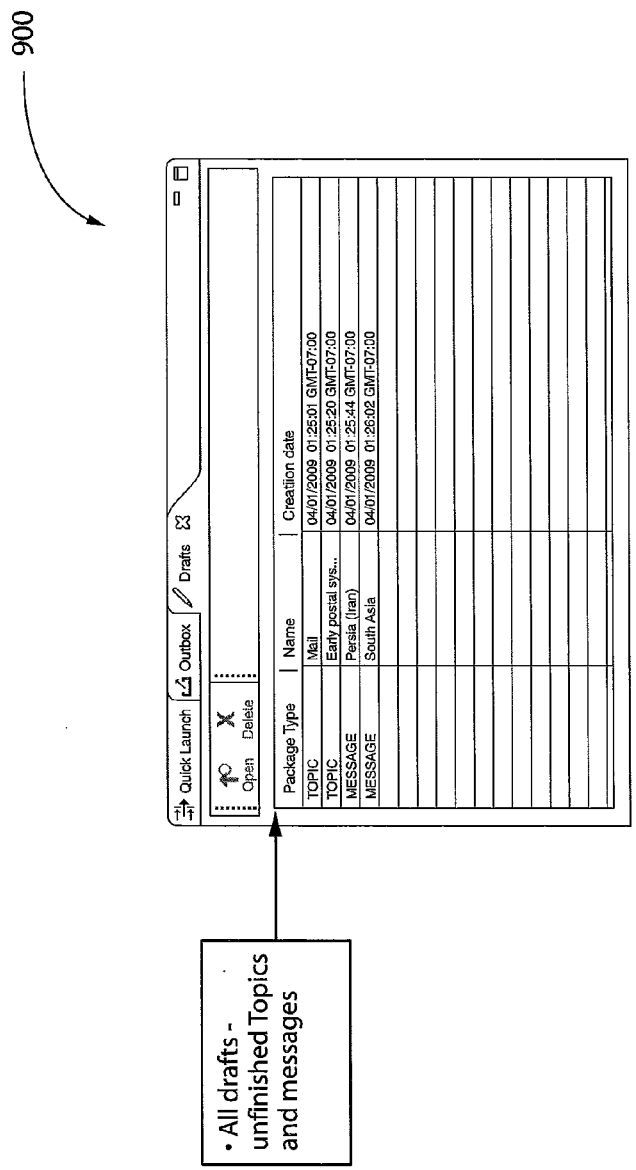
FIG. 9 depicts the drafts portion of the control panel as depicted in full perspective view in FIG. 3.
Figure 10:
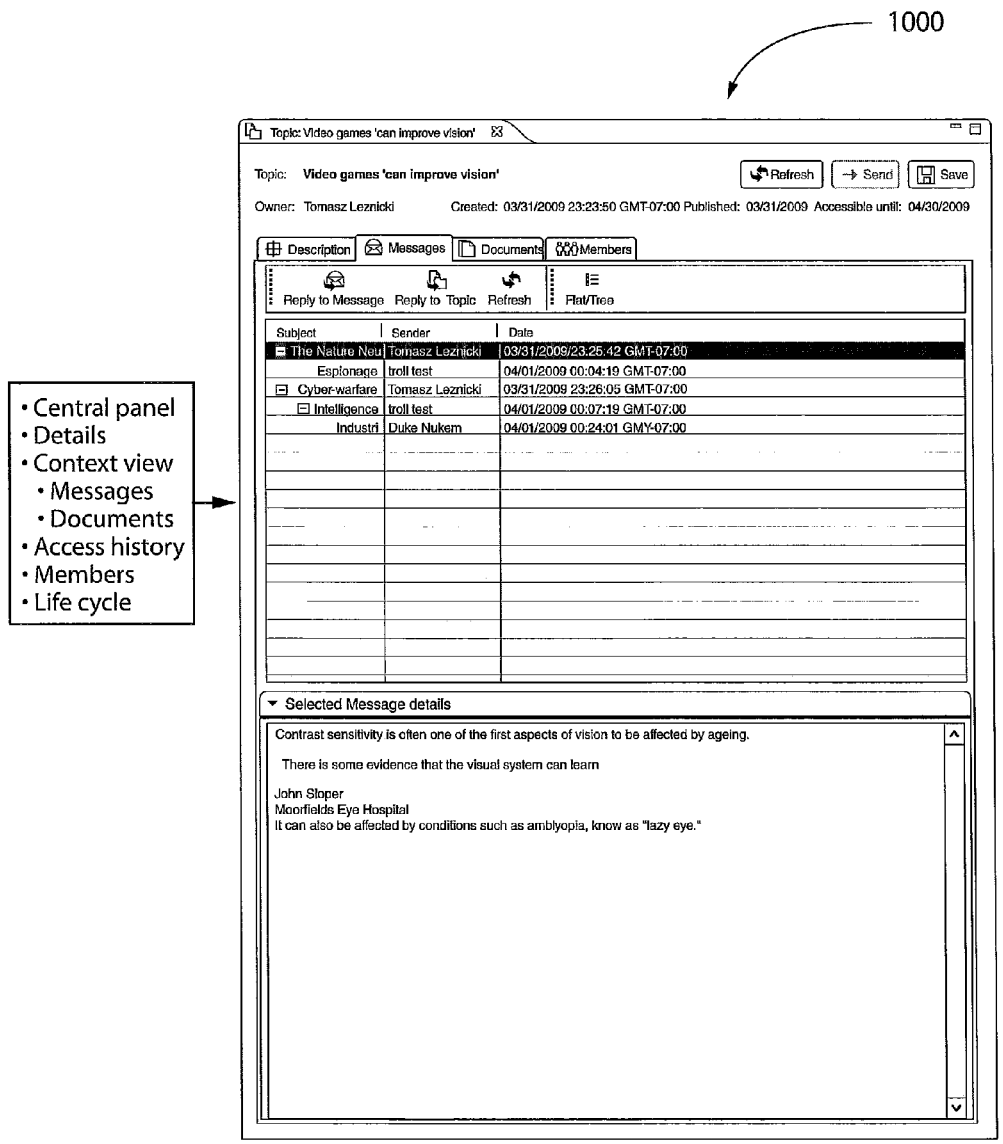
FIG. 10 depicts the topic details portion of the control panel as depicted in full perspective view in FIG. 3.
Figure 11:
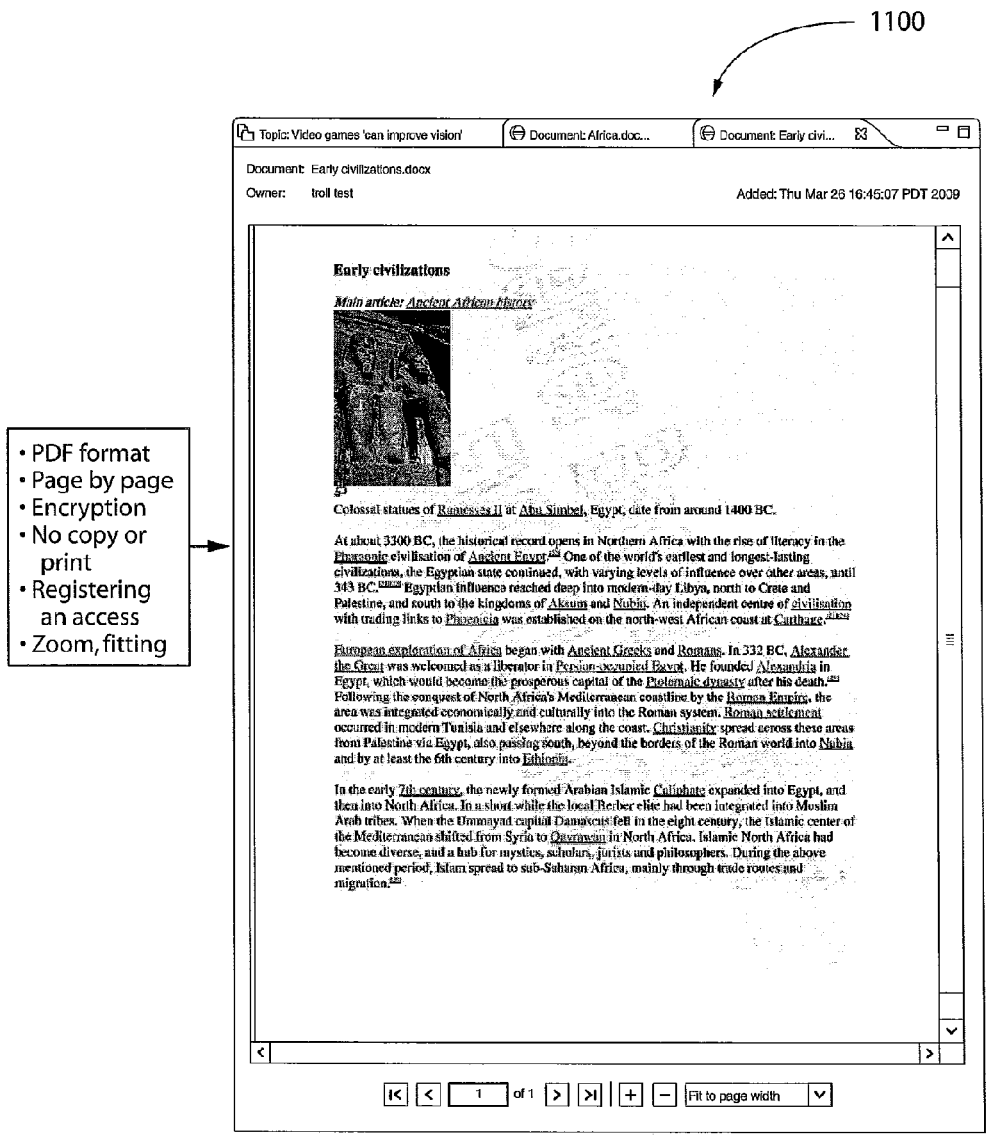
FIG. 11 depicts the document viewer portion of the control panel as depicted in full perspective view in FIG. 3.
Figure 12:
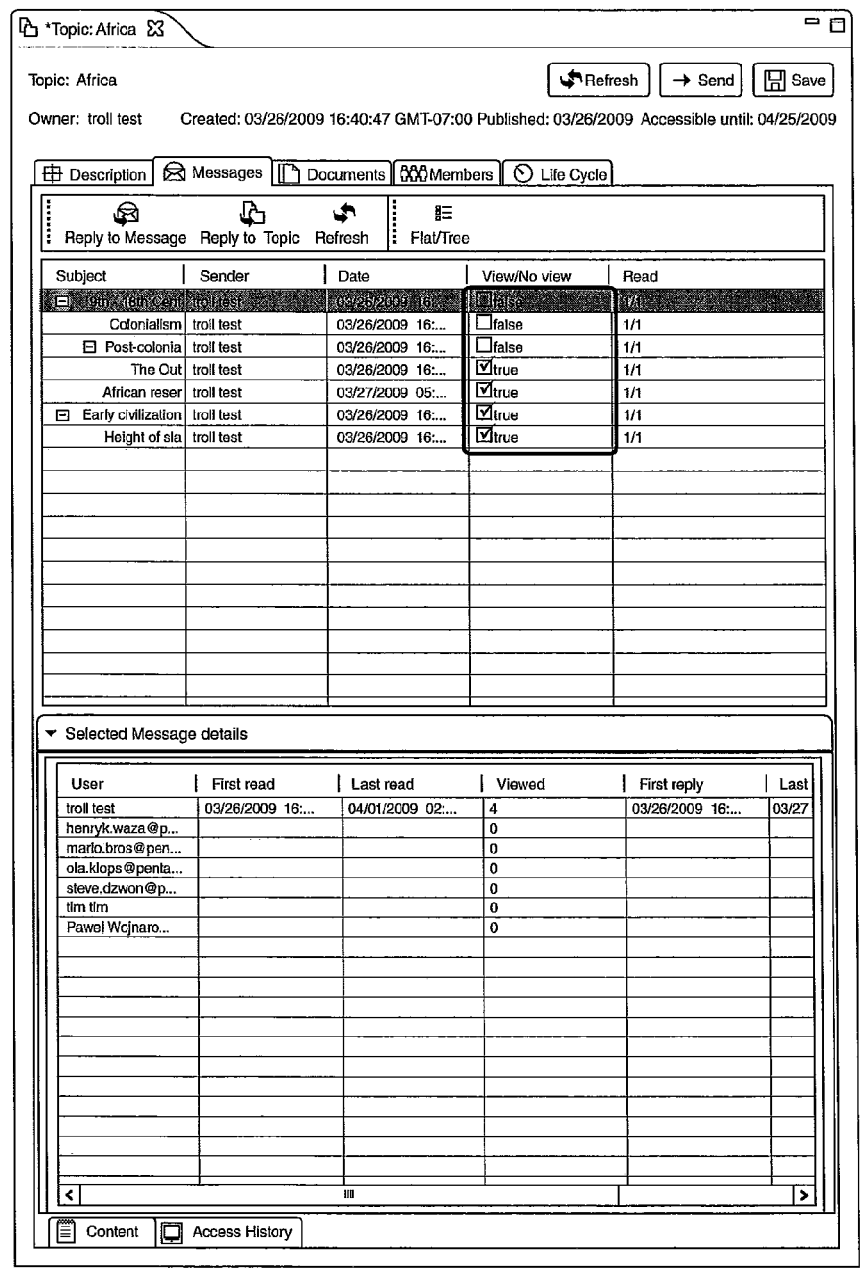
FIG. 12 depicts a message recall window in an embodiment of the present invention.
Figure 13:
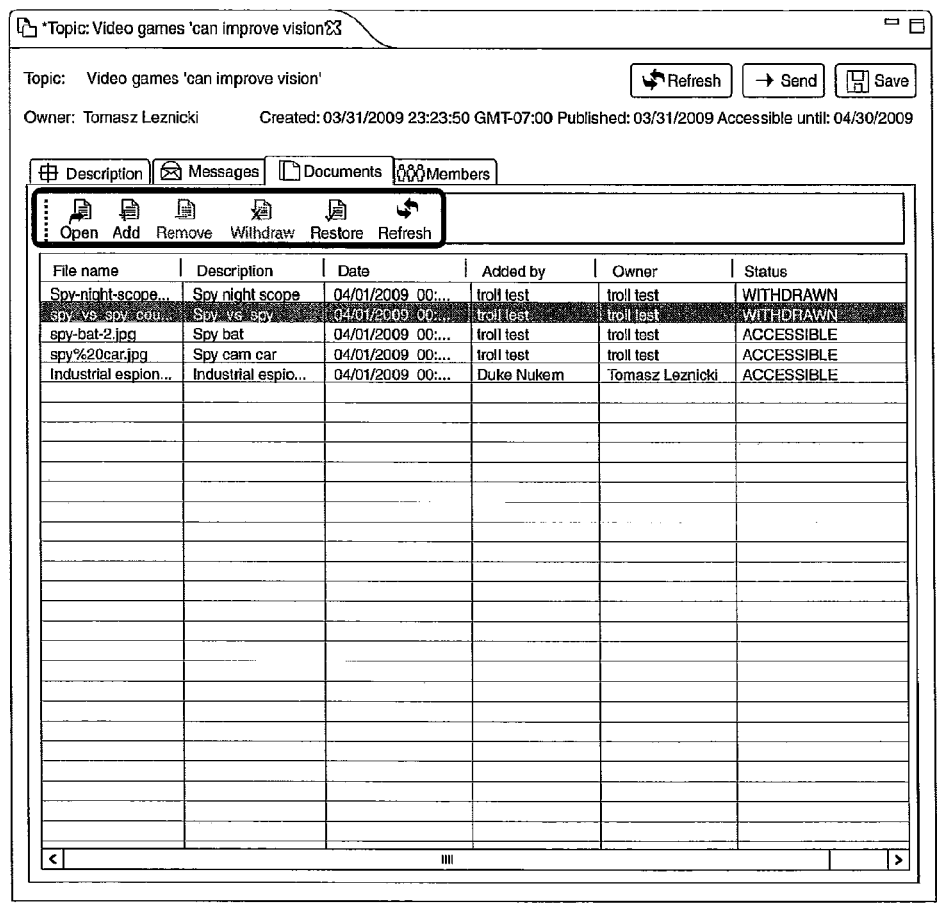
FIG. 13 depicts a document recall window in an embodiment of the present invention.

FIG. 2 shows a topic perspective 200, where a control panel is laid out with a number of views, and where FIG. 3 shows these views 300 broken into sections for easier discussion, including the topic view 400 shown in greater detail in FIG. 4, documents view 500 shown in greater detail in FIG. 5, messages view 600 shown in greater detail in FIG. 6, quick links view 700 shown in greater detail in FIG. 7, outbox view 800 shown in greater detail in FIG. 8, drafts view 900 shown in greater detail in FIG. 9, topic details 1000 view shown in greater detail in FIG. 10, and the document viewer 1100 shown in greater detail in FIG. 11. In embodiments, this may make it easier for the user to navigate the user interface, such as in creating new items, viewing material, using perspectives, asking for help, using the toolbar, docking and labeling a perspective, and the like. In embodiments, the user interface my employ a full user interface or reduced simpler interface, such as presenting only the current task, where the reduced interface is meant to streamline the user desktop by automatically closing open panels when a new item is opened. The user may be able to easily switch between the full user interface and the reduced user interface. Other screen shots illustrating various embodiments of the user interface are provided in FIGS. 12-15, where FIG. 12 details an embodiment for message recall 1200, FIG. 13 for document recall 1300, FIG. 14 for topic membership 1400, and FIG. 15 for topic lifetime 1500. It will be appreciated by one skilled in the art that FIGS. 2-15 represent embodiments of the present invention, and as such should not be considered limiting in any way. However, the figures do help highlight features and capabilities of the present invention. For instance, FIG. 2, and the details of that figure provided in FIGS. 3-11, illustrates a control panel with many functions and capabilities of the system.

Referring to FIG. 4, the topics view 400, a variety of topics are shown, where each topic may represent a separate environment under the control of a subscriber. As shown, each topic may have a different subscriber, may show the date created, the date last revised, a status related to the topic, and the like. In embodiments, a subscriber may have control over the topics that they have created, and access to other topics based on the control parameters set by the controlling subscriber. The subscriber may also invite guests (non-subscribers) to have limited access to the topics they control. As shown, but not meant to be limiting in any way, are tabs for accepting/declining an invitation to a topic controlled by another subscriber, a refresh to update the view, a toggle to enable switching conveniently between topics, and the like.

Referring to FIG. 5, the documents view 500, information relevant to documents is shown, such as for all documents, all documents for a given topic, all documents for a specified subscriber, all documents for a given filter, and the like. As shown, and not meant to be limiting in any way, is a filter window, the name of the document, a description of the document, the owner of the document, creation date of the document, last revision of the document, who's viewed the document, who has viewed what portions of the document, and the like. In embodiments, the present invention may allow a user to control, monitor, trace, and archive documents in such a way as to provide a complete history of a document. That is, the present invention may enable document control that is much more flexible than a static structure created at the beginning of a project can accommodate, and in a much more dynamic real-time manner than traditional archival systems.

Referring to FIG. 6, the messages view 600, information relevant to messages is shown, such as for all messages, all messages for a given topic, all messages for a specified all messages for a given filter, and the like. As shown, and not meant to be limiting in any way, is a filter window, the subject of the message, the sender of the message, the date of the message, the subscriber of the topic related to the message, who's viewed the message, and the like. In embodiments, the present invention may allow a user to control, monitor, trace, and archive messages in such a way as to provide a complete history of a message. That is, the present invention may enable message control and tracking that is much more flexible than a static structure created at the beginning of a project can accommodate, and in a much more dynamic real-time manner than traditional archival systems.

Referring to FIG. 7, the quick links view 700, shows a convenient links page, such as links for all topics, declined topics, unread topics, unsubscribed topics, unpublished topics, topics with unread documents/messages, topics with new documents/messages since the user last logged in, topics with documents the user owns, topics the user owns, and the like. The quick links view may also have links related to messages, such as for all messages, unread messages, read messages, and the like. The quick links view may also have links related to documents, such as for all documents, unread documents, read documents, owned documents, and the like.

Referring to FIG. 8, the outbox view 800, shows all unsent messages, such as per topic, for all topics, and the like. As shown, and not meant to be limiting in any way, the outbox view may provide the message name, the topic name, a header, a creation date, a creation time, and the like.

Referring to FIG. 9, the drafts view 900, shows all drafts, such as for unfinished topics, messages, documents, and the like. As shown, and not meant to be limiting in any way, are the draft name, the draft type, the name of the draft, the creation date of the draft, the last revision of the draft, and the like.

Referring to FIG. 10, the topics detail view 1000, shows a content view of messages and documents, access history, members, life cycle, and the like. As shown, and not meant to be limiting in any way, are tabs for a description of items, messages, documents, members, and the like. In embodiments, the topics detail view may provide a user with a summary view of a topic, such as showing topic name, the owner of the topic, the creation date of the topic, published date of the topic, access time frame for the topic, a details window to show content for a selected item, and the like. In embodiments, and as shown in an embodiment in FIG. 15, the present invention may provide a way for the subscriber to set life-times on items within their control, such as specifying the date/time that a message or document is to be available for viewing, made permanent, deleted, and the like. Lifetime may be related to time, membership, classification type, and the like.

In embodiments, the present invention may provide management for topic life cycle, including publication date, accessibility period, retention period, and the like. When initially preparing a topic, the topic owner may save the topic, such as to Draft using a Save button. This allows them to continue to modify the topic content; description, members, documents, etc. without needing to post the information for other users to see. Once the topic preparation has been completed, the topic owner may use the Send button to submit the topic for publication. The present invention will publish the topic using the Publication Date as specified as a part of Life Cycle setup. This may provide the topic owner with complete control of when the information contained in the topic becomes visible for topic members. The publication date also may provide the starting point for the Accessibility period. The Accessibility period in the topic life cycle defines the period from the publication date during which topic content will remain accessible or visible to topic members. This accessibility may be a default condition and for any message or document, a specific accessibility period can be defined on a group or per user basis. The topic access expiry date, i.e. the day on which the accessibility period for a topic expires, is the starting date for the retention period. Once the topic access expiry date passes, the topic will move to an inaccessible state. When the topic is inaccessible and still in the retention period, the owner can effectively re-open the topic for access by increasing the accessibility period by an amount that places the topic access expiry date into the future. While a topic is still accessible, the owner can close the topic. The date on which the owner or topic manager does this may be deemed the topic access expiry date. At this point, the retention period may be deemed to have not started as the topic now has a new topic access expiry date. Even though a topic or the documents and messages it contains become inaccessible, they are still retained/archived for a specified period of time. This retention period is based upon the topic access expiry date described herein and a retention duration in months or days or is based upon a fixed date which is applied to the complete contents of the topic. The topic owner may set the retention period. Once the retention period for a document or message expires, it may be permanently deleted. The period during which a topic may remain accessible may be based upon two factors. One, all documents and messages must have been permanently deleted. Two, the topic retention period has expired.

Referring to FIG. 11, the documents viewer, shows one embodiment of how documents may be viewed with the system, such as in a pdf format, page-by-page, using encryption, zoom and fitting, and the like.

In embodiments, there may be organizational tools that are used across the graphical interface that are not tied to the structure of the views. For instance, the present invention may utilize a notes application, such as is commonly referred to as sticky notes, where the notes application may be utilized within a topic, perspective, document, message, view, and the like. A 'To Do' list may also be employed as an organizational tool, where for instance the user is presented with a To Do list of all new or unprocessed items, such as unread messages, unread documents, invitations to new topics, and the like. In addition, the present invention may provide for notifications, such as to set preferences. For example, a notification of new To Do items for new messages, documents, topic invitation, and the like may be set, such as for every new item, one new notification after the individual has logged out, once per day, once per number of hours, and the like. Other examples of organizational tools that may be used in conjunction with the present invention include voice recordings (e.g. between individuals, during conferences, by individuals, and the like), chats, IM, webpage usage, and the like.

Figure 16:
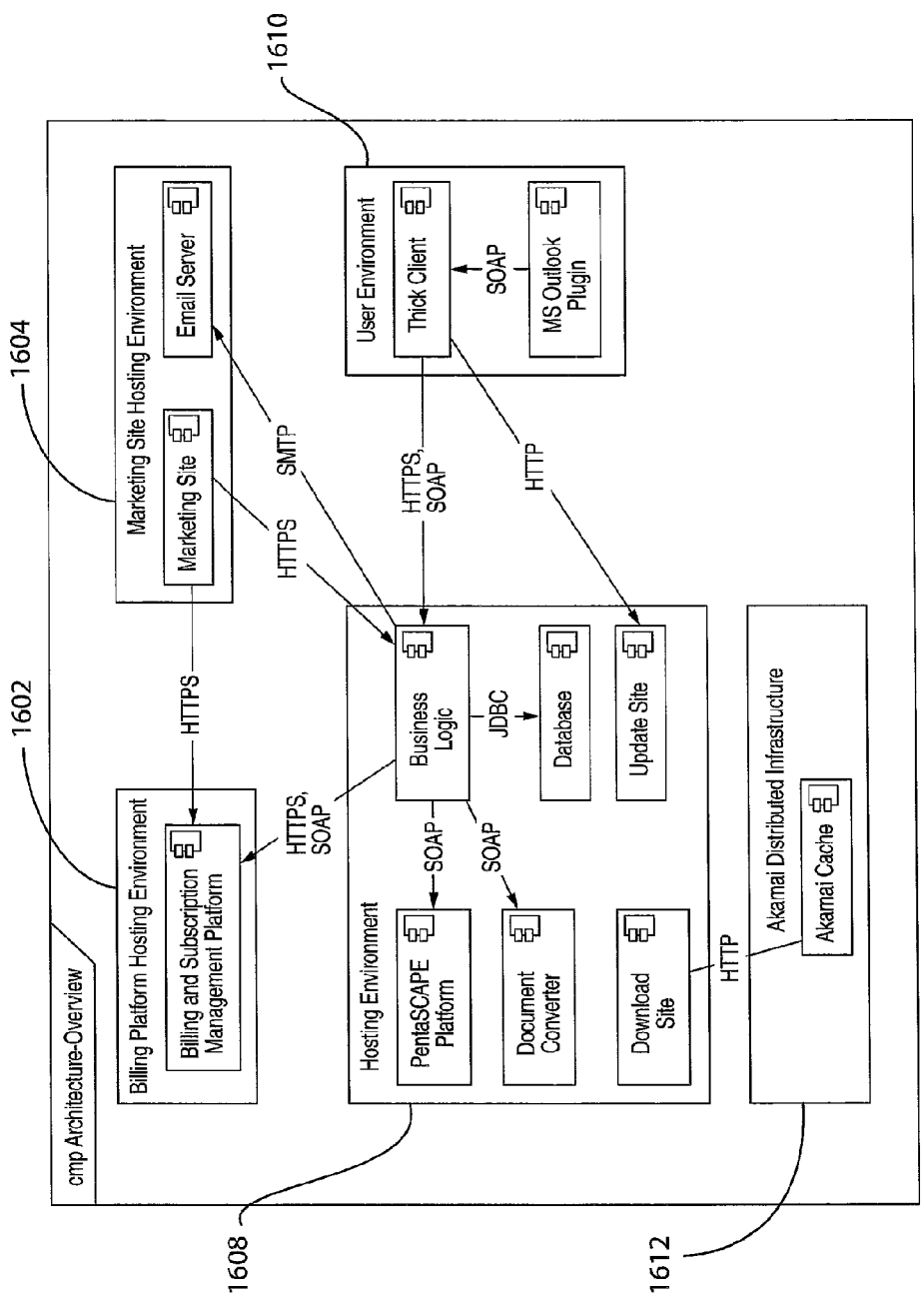
FIG. 16 depicts an embodiment of the architecture of the present invention.

Referring to FIG. 16, in embodiments the architecture of system may include a hosting environment 1608, a user environment 1610, a marketing site hosting environment 1604, a billing platforms hosting environment 1602, a distributed infrastructure 1612, and the like.

In embodiments, the hosting environment 1608 may include business logic, databases, document converters, PKI infrastructure, a download site, an update site, and the like. Business logic may manage the internal services and provide a security layer to insulate the user environment from internals of the systems. Requests for services may be transmitted from the thick client to the business logic for execution. In embodiments, the user identity may be authenticated, where the requesting environment is authenticated as a user operating from a valid environment (e.g. Installed software modules are authenticated). A user service may validate a request, and validated, may authorize a user to receive the service. Pending changes to the user's access rights to the system and specific content may all be processed, and current user status in the system may be confirmed.

In embodiments, the user service requests may be constructed within the secure thick client environment, such as creating a new topic, adding and managing content, adding and managing group membership, managing ownership rights of content, preparing service requests, executing service requests, executing policies, and the like. Creating a new topic may include inviting a group of participants, establishing default life cycle policies and retention periods (minimum and maximum), and the like. Adding and managing content may include a user selecting a topic that includes a group of users, a user enabled to use an editor to compose messages within the environment, a user enabled to include content created outside of the system by identifying the file to the processing system which then transfers a copy into the system, a user enabled to describe message and document content in descriptive headers, information about the life cycle (retention period, visibility period) binded to the document, members of the group provided access privileges either as a group or individually, creating the viewing period (start date and time, end date and time), managing the visibility and life cycle within the policy parameters of the organization, recalling content (remove viewing rights), adding and managing group membership, adding new group members, inactivating existing group members, and the like. Managing ownership rights of content may include ownership hierarchy established for organizations (that pay for subscriptions) and individual subscribers who are provisioned under a subscription agreement, transfer ownership and control upon departure of a subscriber group member or topic owner, closing a topic, removing content from view, and the like. Preparing service requests (thick client) may include managing the workflow of creating content and importing content from other sources, composing and editing, assemble, instruct (create instructions for management of the content), and the like. Service requests may be executed. New content may include packages of new documents, messages, individual communications and instructions decrypted, converted into a standard format and encrypted for storage and retrieval; confirmation of successful processing made to the thick client; encrypted package files deleted and wiped from disk storage, submitter notified of uncorrectable transmission errors and asked to re-submit and/or reconstruct the original package for re-submission; and the like. User administration may include processing new group membership requests, linking invitees to subscriber-guest status, preparing invitations (such as for new guests, where invitation and security link for registration and provisioning, new group members, with invitations to participate in a specified topic), and the like. Registration and provisioning process may include determining whether an individual is an existing user (subscriber or guest), sending invitations via e-mail, registering new guests or communicating rejection of the request, downloading and installing protective software and encryption management modules (which may be individualized) on the new guests' system, and the like. Policies may be executed, such as rules for content retention, ownership, accessibility, life cycle and specific instructions issued by the subscriber that are within the limits set by the rules; instructions/exemptions from the rules based on overriding decisions by management (e.g. documents retained by 'legal hold'), and the like. Business logic may provide templates for role-based responsibilities and authorizations for operation of the system, such as for a topic owner (subscriber who moderates a group and applies discretionary rules for the distribution of documents and extension of permission to individuals who have a need to know), topic manager (subscriber who can act as a deputy to the topic owner, with more limited powers than the owner), security manager (subscriber who can add or detach individuals from membership in a group, provision individuals (add to subscription) at the direction of management, process changes in role assignments, financial manager (subscriber who is administratively responsible for approval and processing of invoices), payer (representative of entity, such as senior management) who is authorized to reassign topics, rights and responsibilities, legal officer (individual who can authorize designating topics as relevant to a particular action and subject to retention as part of a pending court action), and the like.

In embodiments, databases may include the persistent storage of content, metadata of content (e.g. ownership, retention policies, viewing rights, etc.), participants (as content users, subscribers, guests, managers, topic owner, topic manager, financial/administrative manager, security officer, legal officer, access history (date-time & # pages accessed by individuals), usage statistics, contract terms, sales agent, and the like. The document converter may be a JEE application that converts imported documents and other content to the PDF format. A JEE application may be provided that manages PKI infrastructure, such as CA (Certificate Authority) and RA (Request Authority). A download site may be provided for rendering accessible bundles the installation software of a thick customer. An update site may render accessible the updates of software (required by the process of automatic updates).

The user environment 1610 may support different operating systems and platforms, such as MS Windows and Macintosh Leopard & Snow Leopard (including MS Windows XP/Vista/7 in versions 32 bit and 64 bit, Mac 10.5, 10.6; (32 bit and 64 bit), and the like), and may be implemented as a thick client, a third-party plug-in, and the like. The third-party may be MS Outlook, and the optional plug may integrate MS Outlook with the system, enable the dispatch of the email as of news.

In embodiments, the marketing site hosting environment 1604 may provide environment information to target marketing and to the registration of users in the system. Registered users having appropriate authorizations may permit the user to take the newest version of client application. Billing platforms hosting environment 1602 may provide service of payments for the subscription in the system, such as for rendering accessible the safe sides of payments to the realization of transaction credit card.

Figure 17:
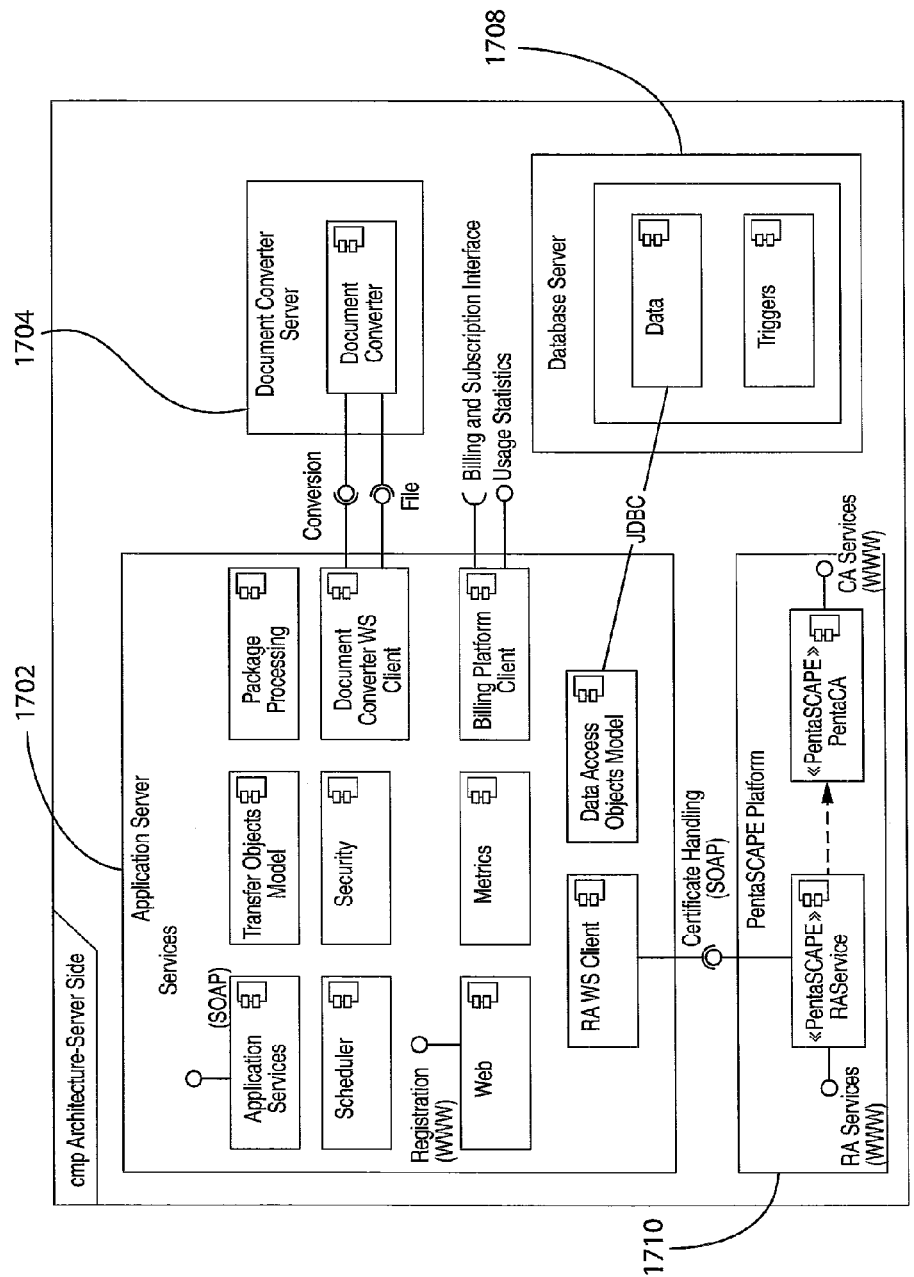
FIG. 17 depicts an embodiment of the server system of the present invention.

Referring to FIG. 17, in embodiments the present invention may be described as a server model, where the figure is presented at a top level, such as without components such as load balancers, firewalls, and other utilities that would be configured to serve a scaled-up data center. The installation is shown in single server format (single sever devoted to a related group of applications). Embodiments of the system could include multiple physical servers performing the same purpose and further divisions in specialized sub-groupings that would be optimized to provide service to a larger group of users. The system can be packaged as an appliance (a tightly coupled standardized hardware, software, and utility packaging) that would be operated as a virtual cluster and administered remotely). The system can be operated as a collection of virtual servers that balance available capacity to the instant activities. The server architecture may include an application server 1702, a database server 1708, a PentaSCAPE server 1710, a document converter server 1704, and the like.

In embodiments, the application server 1702 may run an operating system, such as the Linux operating system and Java Virtual Machine. The essential functionalities may be embodied in a number of modules that process the system functions, such as application services, transfer objects model, scheduler, security, document converter, metrics, user system access, billing platforms client, remote access workstation client, data access objects model, and the like. The document converter server may convert incoming documents into a common format and smaller size individual packages that are encrypted and in sub-assemblies to protect content and optimize retrieval for access by the subscribers and guests. The application services may process incoming requests from the thick clients via a façade interface that activates the internal processes necessary to service a request. In embodiments, clients may not communicate directly with internal processes. Transfer objects model may provide the component necessary to extract data for valid service requests. Package processing may provide a component for implementing operations connected with the preparation and transformation of a special containing of data and metadata, such as using standard CMS (RFC 3852 cryptographic message syntax, PKCS#7. It may handle incoming and outgoing traffic between the hosting environment and the client environment. The scheduler may be a component responsive for the execution of jobs at pre-scheduled date and time, where it may manage deferred viewing and reviewer of rights through a stack implemented in database tables. Security may be provided for processing tasks connected with security rules and policies established in the system. Functionality encompasses authentication and authorization processes related to encryption, decryption, and container verification based on the content manageme4nt system hierarchical rules and validation with user PDI certificates. A document converter WS client may manage the rendering and display of content (e.g. documents, messages) to the end user, and provide communication with the server for the conversion of documents. Metrics may utilized to realize jobs that track user activities in connection with document retrieval, insertions, resource consumption (e.g. storage, transmission) and access history (e.g. audit trail). User system access may interface to WWW that enables sign-in, external notification and identification (e.g. valid e-mail address for the user). Billing platform client may provide internal customer usage (e.g. service resource units) to the external payment services, where it may consume data from the external payment services to manage subscription agreements and continuity of service. Remote access workstation client may provide the consumer of services for management of certificates and verification of identities (e.g. user system access). Data access objects model may provide for a component of data model that structures the relational database model to internally used object model.

In embodiments, the database server 1708 may process database functions to insert, retrieve, store, and maintain relational database integrity. It may also process events through embedded triggers. The PentaSCAPE server 1710 may provide a secure and inclusive platform that manages basic elements of PKI infrastructure, such as a request authority service, a certificate authority service, and the like. The documents converter server 1704 may provide specialized server functions that convert input documents in various formats to the common standard PDF document. The standard documents may be chunked into smaller components, encrypted, and stored with obfuscated keys.

Figure 18:
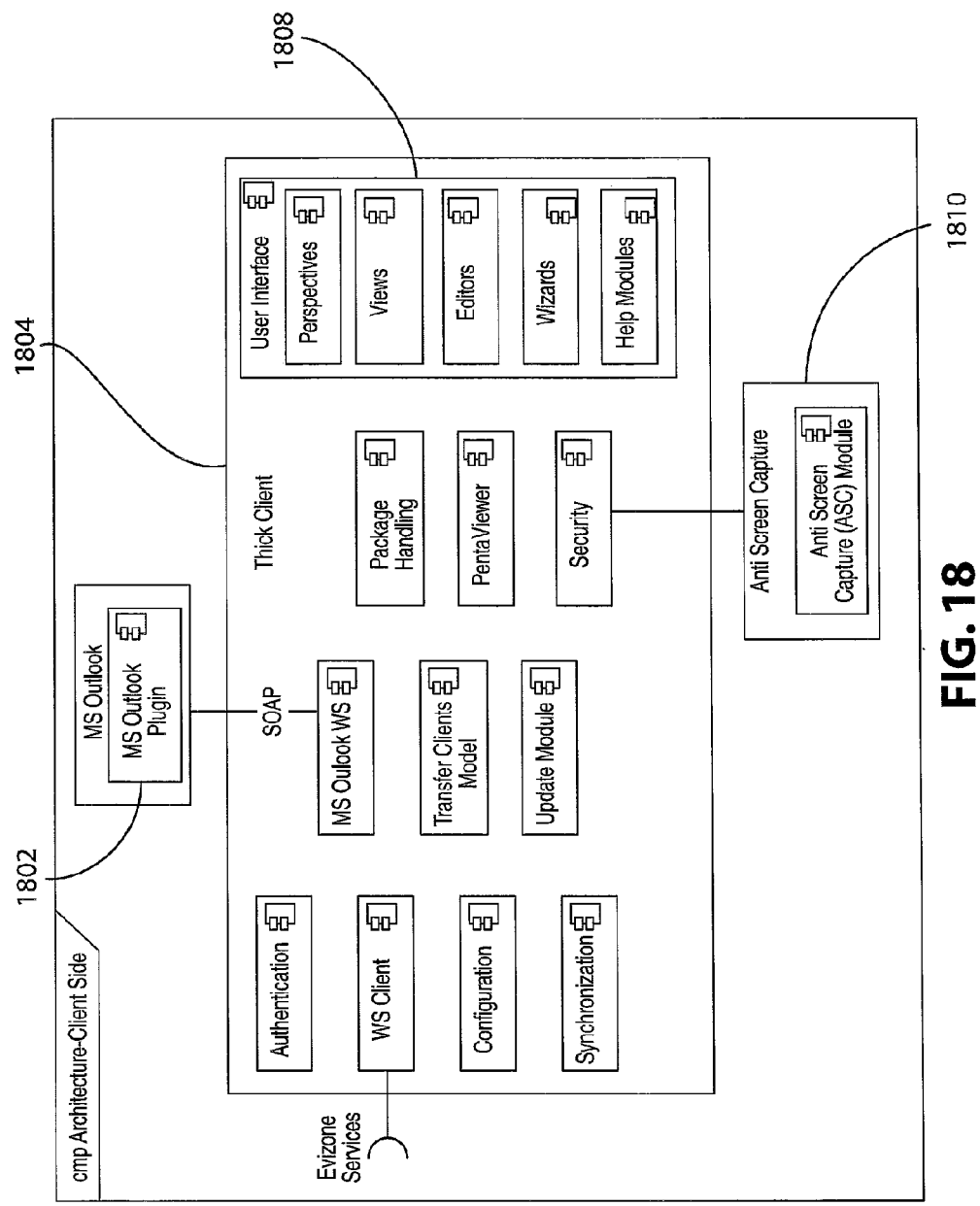
FIG. 18 depicts an embodiment of a thick client configuration of the present invention.

Referring to the FIG. 18, in embodiments the present invention may provide for a thick client structure, including the thick client 1804, a third-party plug-in (such as for MS Outlook), anti-screen capture 1810, and the like. The thick client 1804 may be realized as standalone built on a framework, such as Eclipse RCP. Authentication may be provided for being responsive to the process of authentication to the application. MS Outlook WS may be provided as a server component rendering accessible the services for the needs of the Outlook plug-in (or any other third-party plug-in) and integration with a customer MS Outlook. A WS client may be provided. A transfer object model may be provided and used to exchange information between modules of the server. Package handling may assure the functionality of the preparation and of the transformation of a safe container for data. Configuration components may be provided to the administration by the client application configuration. An update module may be used to be responsible for automatic updates of the system during startup of the application. Updates may be tagged as mandatory or optional based on the degree of commonality between the installed version and current release. A viewer component may be used to process the display of documents in a safe format with protection against the copying of screen components, and utilize security components for the purpose of decrypting contents. Synchronization components may be used to enforce the access rights of users, including real time server updates that issue instructions for changes in the current set of permissions. Access rights are managed at the server level and status changes (both immediate and scheduled) may be implemented through synchronization with the client. In embodiments, a client request may not be fulfilled if the server determines that the requested item of content is not accessible to the user. Security components may provide services for aspects of safety, such as encryption, decryption, signing, signature authentication service of keys and certificates, and the like. There may also be a user interface that manages the display of information, where users may use standard views (e.g. sets of components that display related information), custom views (e.g. sets of components displayed on the screen that fits a user's preferred working style), modifications (such as on the fly) that hide and display components for a particular ad hoc usage. The standard views are described as perspectives that may be invoked from a menu. In addition, there may be third party plug-ins, such as for MS Outlook, that enables the third-party application to serve as a 'front end' input device for the present invention.

In embodiments, the present invention may provide for protection against screen capture, or also referred to as anti screen capture (ASC). The anti screen capture facility may be implemented as an operating system specific application that modifies the environment to disable the printing, copying, forwarding, and the like, of documents (or any other content viewable through the user interface) through internal screen capture (e.g. printing to files) techniques. In embodiments, the ASC facility determines that the ASC code is installed upon startup of the system, and if not, would prevent further startup of the system. As the ASC function may be operating system specific, the present invention may provide for a set of tools and techniques for implementing ASC on particular operating systems. For instance, in an embodiment, an operating system may execute screen capture via an interrupt, and the present invention intercepts the interrupt as part of ASC, such as by modifying table entries. In another embodiment, code may be injected into running processes. In another embodiment, user-space dynamic patching may be used, especially when it not possible to intercept via table modification.

In embodiments, the present invention may provide for a computer program product embodied in a computer readable medium that, when executing on one or more computers, provides a secure user workflow environment by performing the steps of providing the secure workflow environment through a cloud computing facility, wherein the secure workflow environment may be adapted to (1) provide a plurality of users with a workspace that may be adapted to provide secure document management and secure communications management, wherein the plurality of users comprises at least two classes of user: including a participant and a subscriber, the subscriber having control authority within the workspace that exceeds that of the participant and the participant having control over at least some of the participants own interactions with the workspace, (2) maintain a secure instance of each communication provided by each of the plurality of users such that each communication can be managed within the workspace, there being subcategories among both participants and subscribers based on the types of control, administrative or ownership rights, or document access they are given as to particular topics, under the policies of the organization or entity benefiting from the system, (3) maintain a secure instance of each document interaction provided by each of the plurality of users such that each interaction can be managed within the workspace; and extending the secure workflow environment to the plurality of users through a secure communications network connection.

A 'computer readable medium' may be any device, computer program, machine, or tool that can access and execute instructions of a computer program, control the execution of a computer program, or intake and utilize data or information in any form, directly or remotely, including but not limited to a personal computer, laptop computer, Macintosh computer, mobile telephone, smart phone, personal digital assistant, Blackberry, IPhone, IPad, computer server, external computer drive, and the like.

'Cloud computing' may be Internet-based computing, whereby shared resources, software, and information are provided to computers and other devices on-demand, such as through a server architecture as described herein.

A 'document' or a 'communication' may be data or information of any kind embodied in any tangible form, whether electronic, digital, visual, audio, mixed, or otherwise, and whether human readable or machine readable, including but not limited to papers, photographs, films, video or sound recordings, motion pictures, memoranda, books, records, accounts, chats, web pages, instant messages, text messages, communications, word processor generated documents, spreadsheets, presentations, images, notes, audio files, and all retrievable information in computer storage, In embodiments, the secure environment may be exported to the user, residing on and operating within standard computer readable media without the need for special hardware. The documents may not be retrievable by the user except under the controls and limitations of the cloud computing system, including the user's physical and technical inability to alter, print, copy, save, store, retain, or forward the document. No impression, image, or trace of the document may reside on the computer readable media controlled by the user. Access to any document may be immediately withdrawn, even during a viewing session, by the document owner or the subscriber authorized to control the topic in which the document is included.

In embodiments, there may be subscriber controls. A subscriber may create a topic specific workspace and becomes the owner of the topic. A subscriber may invite users to join the topic. The subscriber may become a topic manager. Management may include determining the life cycle of contents included in the communications and document exchange of the topic. Management may include control of which users can view communications and documents within the topic. The subscriber topic owner may assign a second subscriber to be a topic manager. A subscriber may be invited by a topic owner to be a part of the workgroup. The subscriber may have the ability to upload at least one of documents and data into the cloud computing facility without the assistance of a service provider so that access even by the service provider's personnel is restricted. In embodiments, the subscriber may be a security manager, an account administrator, and the like.

In embodiments, there may be participant controls. The participant has been invited to join the workspace. The participant may maintain control of the communications and documents created by them in the workspace. In embodiments, the participants may be an authorized user, guests, and the like.

In embodiment, there may be workflow organization, such as into topics and individual communications. The workspace may be shared amongst the plurality of users as a topic specific workspace, where the communications and documents shared are managed by a subscriber. The topic may have a theme. The theme may be related to a project, company, personal, legal, medical, political, civil interaction, and the like. The subscriber may control the lifetime of contents of each user within the topic. The workspace may be shared between at least two of the users. A workspace may be between only two users formed for one-to-one communications.

In embodiments, there may be communications management. The secure workflow management may include encrypted, traceable, and controlled communications. Communications may be automatically organized into message threads. The message threads may provide historical continuity of the message thread. The message thread may be managed such that individual user histories in the message thread are managed separately. Individual user histories may be eliminated from the message thread. The management of the communications may involve control over whether the communication can be copied, saved, or retained by a user outside the cloud computing facility. The management of the communications may involve control over whether the communication can be printed, altered, forwarded, and the like, by a user. The management of the communications may involve control over whether the communication are viewable only by users selected and permitted by the communication owner. The communications may be withdrawn from display at any time. Access history may be retained for each communication. The access history may include at least one of users that have opened the communication, time of viewing, and number of times a user has viewed the communication. A user's access to documents or data may be restricted and controlled by mechanisms which automatically verify, at each time that access is sought, that the equipment and e-mail address from which the request emanates has been pre-approved by the document-originating user or the document-originating user's sponsor.

In embodiments, there may be documentation management. The document management may include control, traceability, archiving, distribution, access of documents and data, and the like. Documents and data may include a word processor generated document, a spreadsheet, a presentation, an image, a video, a voice recording, a note, an audio file, and the like. Control may include control of viewing of documents and data. Viewing may include reading by viewing the at least one of the document and data. Viewing may include any sensory access. The sensory access may be at least one of viewing visual content and hearing audio content. The documents may not be altered, copied, saved, or retained by a user outside the cloud computing facility, although annotations can be added as new components to documents, by users authorized to do so, thereby creating new documents that can be made available to other authorized users within the workgroup in a layered fashion along with the original document and other authorized annotations. The documents may not be printed, altered, forwarded, and the like, by a user. The documents may be viewable only by users selected and permitted by the document owner. The documents may be withdrawn from display at any time. The time may be at the time of viewing. Access history may be retained for each document and each user. The access history may include users that have opened the document, viewed the document, time of viewing, number of times a user has viewed the document, and the like. The secure workflow environment may be accomplished in part by software which has been designed to anticipate different technical mechanisms and systems through which a user might attempt to at least one of alter, print, copy, save, and transmit documents. The secure workflow environment may be accomplished in part by software which maintains a continuous real time exchange of electronic information between the cloud computing facility and the user's computer facility, in order to sense attempts to at least one of alter, print, copy, save, and transmit the documents. The secure workflow environment may be accomplished in part by software which blocks attempts to at least one of alter, print, copy, save, and transmit the documents through responsive signals from the cloud computing facility. The secure workflow environment may be accomplished in part by software which provides continuous updating of the software to respond to developing technologies which ordinarily permit at least one of alteration, printing, copying, saving, and transmission.

In embodiments, there may be secure content control. The communications and documents may be stored in a persistent state in the cloud computing facility, and where communications and documents are only temporarily viewed by a user through a user computing facility. Control of lifetime, access, and viewing of the communications and documents may be maintained by the user that created them. Control of lifetime, access, and viewing of the communications and documents may be maintained by the subscriber, with guest access to a subset of controls by a user. The guest access control may be authorized by the subscriber. A user may have control to remove the communications and documents created by the user. The subscriber may have control to remove the communications and documents created by the user, with guest access to a subset of controls by a user. The guest control may be authorized by the subscriber. The secure workflow environment includes maintaining access history. The access history may be maintained in a group traceability facility. The secure communications network connection may be a virtual private network.

In embodiments, an application may be exported to users. The cloud computing facility may export a protective application to at least one of the users. In embodiments, the cloud computing facility may export a protective application to all of the users. The cloud computing facility may contain security modules that validate whether the protective application may be installed and active. When validation fails the protective application may be disabled. The validation may be done automatically. Updates may be provided on startup of the protective application. Protective application may be integrated into a third-party application. The third-party application may be Microsoft Outlook. The protective application prevents documents from being copied, printed, saved, altered, and forwarded, and the like.

In embodiments, there may be life cycle control. The secure workflow environment may include controls for the lifetime of the communications and documents. Communications and documents may be permanently deleted at the end of a specified lifetime. The lifetime may be managed through a life cycle policy. The life cycle policy may be executed automatically. The life cycle policy may include an accessibility period, exclusively during which time the specified content may be accessible. The life cycle policy may include an expiration date, from which time the specified content may be no longer accessible. The life cycle policy may include a retention period that extends from the end of the expiration date to the permanent deletion of the specified content. A document may be recalled and a user's access terminated, even during an access and viewing session, by at least one of a document-originating user or document-originating user's sponsor.

In embodiments, there may be ownership features. Ownership and document distribution control may be maintained by at least one of a subscriber and a sponsor of the subscriber. The sponsor may transfer ownership and control to a new subscriber. The transfer may be caused by the subscriber being reassigned. The transfer may be caused by the subscriber being terminated from their employment with the sponsor. The communications may be segregated among a plurality of sponsors. Sponsors may be an employer, manager, organizational lead, project manager, government agency, educational institution, the subscriber, and the like.

In embodiments, there may be a user interface. The secure workflow environment may be organized through a user interface that provides access and control to secure communications and documents. Users may be provided with navigating tools for selecting message threads and selecting, viewing, and replying to specific messages.

In embodiments, an application example of the present invention may be to manage correspondence between two individuals who work together on a regular basis. For instance, one individual may initiate a communication with the present invention listed under the individual's name for easy reference. The workflow between the two individuals may include message and document exchanged, documents as completed work units, pruning of items lists as items become inactive, and the like. An example of such an interchange may include recruiting, contract negotiations, external/internal consulting, and the like. In the example of recruiting, one individual could be the hiring manager and the other could be the recruiter. Messages, documents, and activities for the recruiting effort may include hiring the recruiter, confidential searches, resumes, interviews, travel evaluations, terms, negotiations, acceptance, and the like. Advantages provided through use of the present invention may include a confidential process (e.g. the ability to freely communicate controlled candidate information, where confidentiality may enhance the process), workflow improvement (e.g. workflow between subscriber, recruiter, and recruits; one place for all activities, easy to manage; allowing attention to be directed where needed), and the like.

In embodiments, an application example of the present invention may be with work groups. Workgroups may be formal or informal. Basically, people who collaborate on common activities and need to share information may be considered a workgroup. For example, workgroups may include product development groups, planning groups, acquisition teams, compensation committees, boards of directors, management committees, auditors, and the like.

In embodiments, an application example of the present invention may be for the access and control of medical information, legal information, government information, corporate secure information, personal secure information, trade secret information, non-disclosure agreements, privileged information, and the like. In embodiments, the present invention may be used with hardware security devices, such as identity devices using biometrics (e.g. voice, finger print, and the like), passwords, and the like. The hardware device may provide for portability, such as for temporary check-in and check-out, enabling working in a secure detached mode (e.g. temporary local access). The present invention may provide for location and presence functionality, such as through GPS (e.g. matching a known or expected location of a user to a device), Bluetooth (e.g. determine that the user is in close proximity of the device, otherwise temporarily deny access, and the like), and any other location, presence, proximity detection facility. The device may utilize face recognition to permit access, such as through camera and image matching. The device may utilize a personal video display, such as routing a video display to a headset, heads-up display device, and the like. The present invention may provide for trust classification, where the installed hardware and/or software are verified to meet required security level to exchange information. In embodiments, this could be executed dynamically, such as based on the current session. The present invention may provide facilities for dealing with security breaches. In embodiments, user specified responses to security breaches, such as based on implemented security features and policy, may include disabling the session, disabling the user account, providing access to volumes of misleading data (e.g. disinformation), delay responses, provide a counter-attack, and the like. In embodiments, the present invention may provide for personal security, such as for safety of the individual, including a 'distress' login, hidden distress response, connection to subscriber's security organization for action, and the like. In embodiments, the present invention may provide a record of disclosures, such as content, publication dates to other individuals, tracking of when individuals accessed a document, and the like, for confidential disclosures, including in association with trade secrets, non-disclosure agreements, privileged information (e.g. medical review boards, attorney client, and the like).

The methods and systems described herein may be deployed in part or in whole through a machine that executes computer software, program codes, and/or instructions on a processor. The present invention may be implemented as a method on the machine, as a system or apparatus as part of or in relation to the machine, or as a computer program product embodied in a computer readable medium executing on one or more of the machines. The processor may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipments, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, Java, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

All documents referenced herein are hereby incorporated by reference.

The invention claimed is:

1. A system for securely sharing information between a subscriber user and a guest user, comprising:
a subscriber package operating on a subscriber computing device used by the subscriber user and in secure communication with a server, and
a guest package operating on a guest computing device used by the guest user and in secure communication with the server,
wherein the server is configured: (1) to accept from the subscriber user through the subscriber package the information to be shared with the guest user and a restriction on the guest user's interaction with the information, and (2) to fully and exclusively control the guest user's interaction with the information through the guest package based on the restriction, and
wherein the subscriber user and the guest user are end users, and
wherein the guest package maintains a secure environment on the guest computing device and is configured to prevent the information from being accessed by the guest computing device or a third party outside of the guest package.

2. The system for securely sharing information of claim 1, wherein the restriction on the guest user's interaction with the information comprises at least one of viewing, altering, printing, copying, saving, storing, retaining, capturing screen shots of or forwarding the information.

3. The system for securely sharing information of claim 1, wherein the information comprises at least one of a document, a spreadsheet, a picture, a chat session, an instant message, a video, a video recording, an audio-visual recording, an audio recording, an audio and voice recording, a voice service, a speech-to-text transcription, an internet content, a presentation, an email message, an internet telephone call, a video call, a map, a map layer associated with data, an RSS feed, a computer data file, a computer encoded data file or an annotation.

4. The system for securely sharing information of claim 1, wherein the information is grouped into a topic by the subscriber user, the subscriber user having exclusive access control over the topic.

5. The system for securely sharing information of claim 4, wherein the server is further configured to automatically organize the information in the topic.

6. The system for securely sharing information of claim 1, wherein the server is configured to record an access history of the guest user's interaction with the information.

7. The system for securely sharing information of claim 6, wherein the server is configured to generate an audit trail for the information based at least partially on the access history.

8. The system for securely sharing information of claim 1, wherein the restriction comprises a lifetime.

9. The system for securely sharing information of claim 1, wherein the restriction comprises a number of views of the information by the guest user.

10. The system for securely sharing information of claim 1, wherein the server is configured to confirm that the guest package is properly operating on the guest computing device before transmitting the information to the guest package.

11. The system for securely sharing information of claim 1, wherein the server is further configured to: (1) register at least one of the following: an authorized guest computing device, an authorized guest user, an authorized guest user email address, or any combination thereof, and (2) verify, each time access to the information is requested, that at least one of the guest computing device or the guest user email address has been pre-approved by a topic-owner.

12. The system for securely sharing information of claim 1, wherein the subscriber package is configured to enable the subscriber user to specify the restriction.

13. A system for securely sharing information between a sender and a recipient user, comprising:
a sender package operating on a sender computing device used by the sender and in secure communication with a server, and
a recipient package operating on a recipient computing device used by the recipient and in secure communication with the server,
wherein the server is configured: (1) to accept from the sender through the sender package the information to be shared with the recipient and a restriction on the recipient's interaction with the information, and (2) to fully and exclusively control the recipient's interaction with the information through the recipient package based on the restriction, and
wherein the sender and the recipient are end users, and
wherein the recipient package maintains a secure environment on the recipient computing device and is configured to prevent the information from being accessed by the recipient computing device or a third party outside of the recipient package.

14. The system for securely sharing information of claim 13, wherein the restriction on the recipient's interaction with the information comprises at least one of viewing, altering, printing, copying, saving, storing, retaining, capturing screen shots of or forwarding the information.

15. The system for securely sharing information of claim 13, wherein the information comprises at least one of a document, a spreadsheet, a picture, a chat session, an instant message, a video, a video recording, an audio-visual recording, an audio recording, an audio and voice recording, a voice service, a speech-to-text transcription, an internet content, a presentation, an email message, an internet telephone call, a video call, a map, a map layer associated with data, an RSS feed, a computer data file, a computer encoded data file or an annotation.

16. The system for securely sharing information of claim 13, wherein the information is grouped into a topic by the sender, the sender having exclusive access control over the topic.

17. The system for securely sharing information of claim 16, wherein the server is further configured to automatically organize the information in the topic.

18. The system for securely sharing information of claim 13, wherein the server is configured to record an access history of the recipient's interaction with the information.

19. The system for securely sharing information of claim 18, wherein the server is configured to generate an audit trail for the information based at least partially on the access history.

20. The system for securely sharing information of claim 13, wherein the restriction comprises a lifetime.

21. The system for securely sharing information of claim 13, wherein the restriction comprises a number of views of the information by the recipient.

22. The system for securely sharing information of claim 13, wherein the server is configured to confirm that the recipient package is properly operating on the recipient computing device before transmitting the information to the recipient package.

23. The system for securely sharing information of claim 13, wherein the server is further configured to: (1) register at least one of the following: an authorized recipient computing device, an authorized recipient, an authorized recipient email address, or any combination thereof, and (2) verify, each time access to the information is requested, that at least one of the recipient computing device or the recipient email address has been pre-approved by a topic-owner.

24. The system for securely sharing information of claim 13, wherein the sender package is configured to enable the sender to specify the restriction.

* * * * *

UNITED STATES PATENT AND TRADEMARK OFFICE
CERTIFICATE OF CORRECTION

PATENT NO.         : 9,569,596 B2                                  Page 1 of 1
APPLICATION NO.    : 14/263709
DATED              : February 14, 2017
INVENTOR(S)        : Michael Bernard Marcus et al.

It is certified that error appears in the above-identified patent and that said Letters Patent is hereby corrected as shown below:

Column 8, Line 55, "responsibilities" to read as --responsibilities)--.

Column 10, Line 7, ")(" to read as --x--.

Column 20, Line 39, "assignments," to read as --assignments),--.

Column 20, Line 52, "legal officer," to read as --legal officer),--.

Column 21, Line 27, "remotely)." to read as --remotely.--.

Column 21, Line 55, "PKCS#7." to read as --PKCS#7).--.

Column 21, Lines 65-66, "manageme4nt" to read as --management--.

Column 24, Line 19 approx., "storage," to read as --storage.--.

Signed and Sealed this
Eighth Day of August, 2017

Joseph Matal
*Performing the Functions and Duties of the*
*Under Secretary of Commerce for Intellectual Property and*
*Director of the United States Patent and Trademark Office*